(12) United States Patent
Ohishi et al.

(10) Patent No.: US 6,205,164 B1
(45) Date of Patent: Mar. 20, 2001

(54) LASERS, OPTICAL AMPLIFIERS, AND AMPLIFICATION METHODS

(75) Inventors: Yasutake Ohishi; Makoto Yamada; Terutoshi Kanamori; Shoichi Sudo, all of Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 08/867,745

(22) Filed: Jun. 3, 1997

(30) Foreign Application Priority Data

Apr. 23, 1997 (JP) ................................................ 9-106055

(51) Int. Cl.$^7$ ............................. H01S 3/091; H01S 3/14
(52) U.S. Cl. ........................... 372/70; 359/341; 359/342; 359/345; 372/6; 372/39
(58) Field of Search ..................................... 372/6, 39–42, 372/69, 70; 385/15, 27; 359/341–343, 345

(56) References Cited

U.S. PATENT DOCUMENTS

| | | | |
|---|---|---|---|
| 4,962,995 | * 10/1990 | Andrews et al. | 372/6 X |
| 5,134,517 | 7/1992 | Marcerou et al. | 359/341 |
| 5,247,529 | 9/1993 | Heidemann | 372/23 |
| 5,251,062 | * 10/1993 | Snitzer et al. | 359/341 |
| 5,278,850 | * 1/1994 | Ainslie et al. | 372/6 |
| 5,283,846 | * 2/1994 | Toyonaka et al. | 385/27 |
| 5,351,335 | * 9/1994 | Ohishi et al. | 372/6 X |
| 5,453,873 | 9/1995 | Millar et al. | 359/341 |
| 5,481,391 | * 1/1996 | Giles | 359/341 X |
| 5,502,591 | * 3/1996 | Semenkoff et al. | 359/341 |
| 5,568,497 | * 10/1996 | Bishop et al. | 372/40 |
| 5,594,747 | 1/1997 | Ball | 372/31 |
| 5,629,953 | * 5/1997 | Bishop et al. | 372/39 |
| 5,838,487 | * 11/1998 | Nilsson et al. | 359/341 |

FOREIGN PATENT DOCUMENTS

| | | |
|---|---|---|
| 0 508 149 | 10/1992 | (EP) . |
| 4-010586 | 1/1992 | (JP) . |
| 4-149525 | 5/1992 | (JP) . |
| 93/01637 | 1/1993 | (WO) . |

OTHER PUBLICATIONS

Schneider J., "Mid–Infrared Fluoride Fiber Lasers in Multiple Cascade Operation", IEEE Photonics Technology Letters, vol. 7, No. 4, Apr. 1995, pp. 354–356.

Yamada M. et al, "A low–noise and gain–flattened fluoride–based $Er^{3+}$–doped fiber amplifier pumped by a 0.97 $\mu$m laser diode", Electronics Letters, vol. 33, No. 9, pp. 809–810, Apr. 24, 1997.

Makoto Yamada et al., "A Low–Noise and Grain–Flattened Amplifier Composed of a Silica–Based and a Fluoride–based $Er^{3+}$ –Doped Fiber Amplifier in a Cascade Configuration", IEEE Photonics Technology Letters, vol. 8, No. 5, 1996, pp. 619–622.

Makoto Yamada et al., "Fluoride–Based Erbium–Doped Fiber Amplifier with Inherently Flat Gain Spectrum", IEEE Photonics Technology Letters, vol. 8, No. 7, Jul. 1996, pp. 881–884.

\* cited by examiner

*Primary Examiner*—John D. Lee
(74) *Attorney, Agent, or Firm*—Venable; Robert J. Frank; Catherine M. Voorhees

(57) ABSTRACT

An optical amplification medium doped with $Er^{3+}$ ions is selected from the group of a fluoride glass, a chalcogenide glass, a telluride glass, a halide crystal, and a lead oxide based glass. The $Er^{3+}$ ions are excited by light of at least one wavelength in the range of 0.96 $\mu$m to 0.98 $\mu$m. A laser or an optical amplifier includes this optical amplification medium doped with $Er^{3+}$ ions. Furthermore, an optical amplification method performs an optical amplification using the optical amplifier having the optical amplification medium doped with $Er^{3+}$ ions. Thus, the laser to be applied in the field of optical communication, the optical amplifier having the characteristics of low noise and high gain, and the optical amplification method can be provided.

20 Claims, 15 Drawing Sheets

LASERS, OPTICAL AMPLIFIERS, AND AMPLIFICATION METHODS

BACKGROUND OF THE INVENTION

1. Field of the Invention

The present invention relates to lasers, optical amplifiers with the properties of low noise and high gain, and amplification methods.

2. Description of the Related Art

In recent years, the development of an optical amplifier, in which an optical fiber having a core doped with a rare earth element is provided as an amplification medium, has been worked on for applications in the field of optical communication. Particularly, an erbium ($Er^{3+}$)-doped fiber amplifier (EDFA) has been developed, and development efforts are being made to increase applications of the EDFA to an optical communication system.

Recently, a wavelength division multiplexing (WDM) technique has been studied extensively to cope with the diversification of communication service to be expected in coming years. The WDM technique is an optical communication technique that uses a system of multiplexing wavelengths for the sake of an effective use of available transmission medium leading to enlarge a transmission volume. One of the characteristics required in the EDFA applied in the WDM technique is a small variation in an amplification gain with respect to a signal wavelength. There are power differentials among optical signals which are transitionally amplified by passing through a multi-stage arrangement of the EDFAs, so that it is difficult to perform the signal transmission with uniform characteristics maintained across all of the wavelengths being used. Presently, therefore, the EDFA showing a flat gain region with respect to the predetermined wavelengths has been investigated by persons skilled in the art.

Attention is being given to an erbium($E^{3+}$)-doped fluoride fiber amplifier (F-EDFA) as a most promising candidate as the EDFA, in which a fluoride-based fiber is used as a host of $Er^{3+}$. The F-EDFA is characterized by its emission spectrum caused by a transition from the $^4I_{13/2}$ level to the $^4I_{15/2}$ level of $Er^{3+}$ ions in the fluoride glass at a wavelength band of 1.55 $\mu$m.

FIG. 1 shows a typical amplitude spontaneous emission (ASE) spectrum of the F-EDFA. This figure also shows the ASE spectrum of an $Er^{3+}$-doped silica glass fiber (S-EDFA). As shown in the figure, the emission spectrum (a full line in the figure) of the F-EDFA is broader than the emission spectrum (a dashed line in the figure) of the S-EDFA. In addition, the response curve of the F-EDFA is smoother than that of the S-EDFA and is flat on top without any steep portion depended on a wavelength in the predetermined wavelength region (M. Yamada et al., IEEE Photon. Technol. Lett., vol. 8, pp882–884, 1996). Furthermore, experiments of wavelength division multiplexing have been carried out using multi-staged F-EDFAs, for example a cascade configuration with a 980 nm pumped S-EDFA and a 1480 nm pumped F-EDFA (M. Yamada et al., IEEE Photon. Technol. Lett., vol. 8, pp620–622, 1996).

In spite of the above development efforts, the F-EDFA has a problem that it cannot reduce a noise figure (NF) as much as that observed in the S-EDFA because of the following reasons.

FIG. 2 is an energy diagram of $Er^{3+}$. A phonon energy takes a value on the order of 1,100 $cm^{-1}$ when the EDFA uses a silica optical fiber as an amplification medium (i.e., in the case of the S-FDFA), so that a favorable population inversion between the $^4I_{13/2}$ level and the $^4I_{15/2}$ level can be formed by an efficient excitation to the $^4I_{13/2}$ level as a result of a phonon emitted relaxation from higher energy levels to the $^4I_{13/2}$ level after exciting to the $^4I_{13/2}$ level by 0.98 $\mu$m pump light (FIG. 2 (A)). Consequently, the S-EDFA enables a reduction in the NF to about 4 dB which is close to a quantum limit (3 dB). On the other hand, the F-EDFA cannot perform an excitation to the $^4I_{13/2}$ level using a transmission from the $^4I_{15/2}$ level to the $^4I_{11/2}$ level because of its low phonon energy. That is, the F-EDFA has a phonon energy of about 500 $cm^{-1}$ which is almost half of the S-EDFA's phonon energy, so that it is difficult to cause a phonon emitted relaxation from the $^4I_{11/2}$ level to the $^4I_{13/2}$ level and to obtain an amplification gain by 0.98 $\mu$m pump light. In this case, therefore, an amplification gain at a wavelength of 1.55 $\mu$m is obtained by directly exciting from the $^4I_{15/2}$ level to the $^4I_{13/2}$ level using light at a pump wavelength of about 1.48 $\mu$m (FIG. 2 (B)). However, this kind of the excitation is an initial excitation of the gland energy level to the higher energy level, so that it is difficult to make a favorable population inversion in which the number of $Er^{3+}$ ions at higher energy levels exceed those at lower energy levels, resulting in the high NF (i.e., 6 to 7 dB).

Therefore, the conventional F-EFDA with favorable noise characteristics has not been realized, compared with that of the S-EFDA.

SUMMARY OF THE INVENTION

It is an object of the invention to solve the above problem (i.e., high noise figure) associated with conventional F-EDF's and to provide a laser, an optical amplifier with the properties of low noise, and high and flat gain, and an amplification method.

In a first aspect of the present invention, there is provided an optical amplification method that uses an optical amplification medium doped with $Er^{3+}$ ions, comprising a step of exciting the $Er^{3+}$ ions by light of at least one wavelength in a range of 0.96 $\mu$m to 0.98 $\mu$m, where the optical amplification medium is selected from a group of a fluoride glass, a chalcogenide glass, a telluride glass, a halide crystal, and a lead oxide based glass.

Here, the optical amplification medium may be in a shape of a fiber.

In a second aspect of the present invention, there is provided an optical amplifier having an optical amplification medium doped with $Er^{3+}$ ions, wherein the optical amplification medium is selected from a group of a fluoride glass, a chalcogenide glass, a telluride glass, a halide crystal, and a lead oxide based glass, and the $Er^{3+}$ ions is excited by light of at least one wavelength in a range of 0.96 $\mu$m to 0.98 $\mu$m.

The optical amplification medium may be in a shape of a fiber.

The optical amplifier may further comprise:

a light source for an excitation to $^4I_{13/2}$ level.

In a third aspect of the present invention, there is provided an optical amplification method that uses an optical amplifier having: an optical amplification medium doped with $Er^{3+}$ ions and selected from a group of a fluoride glass, a chalcogenide glass, a telluride glass, a halide crystal, and a lead oxide based glass; a light source for exciting the $Er^{3+}$ ions with an oscillation wavelength in a range of 0.96 $\mu$m to 0.98 $\mu$m; and a light source for an excitation to $^4I_{13/2}$ level, comprising steps of:

launching a first pump light, which is emitted in the same direction as that of a launched signal light into the optical amplification medium from the light source for exciting the $Er^{3+}$ ions with an oscillation wavelength in a range of 0.96 μm to 0.98 μm, into the optical amplification medium; and launching a second pump light, which is emitted in an opposite direction of the first pump light, from the light source for an excitation to $^4I_{13/2}$ level into the optical amplification medium.

Here, the optical amplification medium may be in a shape of a fiber.

In a fourth aspect of the present invention, there is provided an a laser having an optical amplification medium doped with $Er^{3+}$ ions and a pump light source for an excitation of the optical amplification medium and using an induced emission of $Er^{3+}$ ions from $^4I_{13/2}$ level to $^4I_{15/2}$ level, wherein the pump light source includes at least a first light source and a second light source, which emit light at different wavelengths, and the first light source is provided as a light source for emitting light at a wavelength corresponding to an energy difference between $^4I_{13/2}$ level of the $Er^{3+}$ ions and an energy level higher than the $^4I_{13/2}$ level.

Here, the first light source may be provided as a light source for emitting light at a wavelength corresponding to an energy difference between $^4I_{13/2}$ level and one energy level selected from a group of $^4I_{11/2}$ level, $^4I_{9/2}$ level, $^4F_{9/2}$ level, and $^4S_{3/2}$ level of the $Er^{3+}$ ions.

The second light source may be provided as a light source for emitting light at a wavelength corresponding to an energy difference between $^4I_{15/2}$ level and one energy level selected from a group of $^4I_{11/2}$ level and $^4F_{9/2}$ level of the $Er^{3+}$ ions.

The laser may further comprise a third light source, wherein the first light source is provided as a light source for emitting light at a wavelength corresponding to an energy difference between $^4I_{13/2}$ level and $^4S_{3/2}$ level of the $Er^{3+}$ ions;

the second light source is provided as a light source for emitting light at a wavelength corresponding to an energy difference between $^4I15/2$ level and $^4I_{11/2}$ level of the $Er^{3+}$ ions; and the third light source is provided as a light source for emitting light at a wavelength corresponding to an energy difference between $^4I_{15/2}$ level and $^4I_{13/2}$ level of the $Er^{3+}$ ions.

The first light source may be provided as a light source for emitting light at a wavelength of 0.82 μm to 0.88 μm; and the second light source may be provided as a light source for emitting light at a wavelength of 0.96 μm to 0.98 μm.

The optical amplification medium doped with $Er^{3+}$ ions may be selected from a group of a fluoride fiber doped with $Er^{3+}$ ions, a chalcogenide fiber doped with $Er^{3+}$ ions, a telluride fiber doped with $Er^{3+}$ ions, and a halide crystal doped with $Er^{3+}$ ions.

In a fifth aspect of the present invention, there is provided an optical amplifier at least comprising:

an optical amplification medium doped with $Er^{3+}$ ions;

means for inducing and isolating signal light at a wavelength of 1.5 μm into the optical amplification medium; and a pump light source for an excitation of the optical amplification medium, wherein the pump light source includes at least a first light source and a second light source, which emit light at different wavelengths, and the first light source is provided as a light source for emitting light at a wavelength corresponding to an energy difference between $^4I_{13/2}$ level of the $Er^{3+}$ ions and an energy level higher than the $^4I_{13/2}$ level.

Here, the first light source may be provided as a light source for emitting light at a wavelength corresponding to an energy difference between $^4I_{13/2}$ level and one energy level selected from a group of $^4I_{11/2}$ level, $^4I_{9/2}$ level, $^4F9/2$ level, and $^4S_{3/2}$ level of the $Er^{3+}$ ions.

The second light source may be provided as a light source for emitting light at a wavelength corresponding to an energy difference between $^4I_{15/2}$ level and one energy level selected from a group of $^4I_{11/2}$ level and $^4F_{9/2}$ level of the $Er^{3+}$ ions.

The optical amplifier may further comprise a third light source, wherein the first light source is provided as a light source for emitting light at a wavelength corresponding to an energy difference between $^4I_{13/2}$ level and $^4S_{3/2}$ level of the $Er^{3+}$ ions;

the second light source is provided as a light source for emitting light at a wavelength corresponding to an energy difference between $^4I_{15/2}$ level and $^4I_{11/2}$ level of the $Er^{3+}$ ions; and the third light source is provided as a light source for emitting light at a wavelength corresponding to an energy difference between $^4I_{15/2}$ level and $^4I_{13/2}$ level of the $Er^{3+}$ ions.

The first light source may be provided as a light source for emitting light at a wavelength of 0.82 μm to 0.88 μm; and the second light source may be provided as a light source for emitting light at a wavelength of 0.96 μm to 0.98 μm.

The second light source may be provided as a light source for emitting light at a wavelength corresponding to an energy difference between $^4I_{15/2}$ level and $^4I_{13/2}$ level of the $Er^{3+}$ ions.

The optical amplification medium doped with $Er^{3+}$ ions may be selected from a group of a fluoride fiber doped with $Er^{3+}$ ions, a chalcogenide fiber doped with $Er^{3+}$ ions, a telluride fiber doped with $Er^{3+}$ ions, and a halide crystal doped with $Er^{3+}$ ions.

In a sixth aspect of the present invention, there is provided an optical amplifier that uses $Er^{3+}$ ions as an amplification active elements, comprising:

means for launching at least one light at a wavelength corresponding to an energy difference between $^4I_{15/2}$ level and $^4I_{11/2}$ level of the $Er^{3+}$ ions, at least one light at a wavelength corresponding to an energy difference between $^4I_{15/2}$ level and an energy level higher than the $^4I_{11/2}$ level of the $Er^{3+}$ ions, and at least one light to be amplified by an induced emission transition from $^4I_{13/2}$ level to $^4I_{15/2}$ level into an amplification medium doped with the $Er^{3+}$ ions from same direction.

Preferably, the light at a wavelength different from the signal light and corresponding to an energy difference between $^4I_{13/2}$ level and $^4I_{15/2}$ level of the $Er^{3+}$ ions may be launched into the optical amplification medium from a direction different from the same direction.

In a seventh aspect of the present invention, there is provided an optical amplification method that uses $Er^{3+}$ ions as amplification active elements, comprising a step of launching light at a wavelength corresponding to an energy difference between $^4I_{15/2}$ level and $^4I_{11/2}$ level of the $Er^{3+}$ ions, light at a wavelength corresponding to an energy difference between $^4S_{3/2}$ level and $^4I_{13/2}$ level of the $Er^{3+}$ ions, and light to be amplified by an induced emission transition from $^4I_{13/2}$ level to $^4I_{15/2}$ level into an amplification medium doped with the $Er^{3+}$ ions from same direction.

Here, the light at a wavelength different from the signal light and corresponding to an energy difference between $^4I_{13/2}$ level and $^4I_{15/2}$ level of the $Er^{3+}$ ions may be launched into the optical amplification medium from a direction different from the same direction.

In an eighth aspect of the present invention, there is provided an optical amplification method that uses $Er^{3+}$ ions as amplification active elements, comprising a step of launching light at a wavelength of 0.82 μm to 0.88 μm, light at a wavelength of 0.96 μm to 0.98 μm, and light to be amplified by an induced emission transition from $^4I_{13/2}$ level to $^4I_{15/2}$ level into an amplification medium doped with the $Er^{3+}$ ions from same direction.

DETAILED DESCRIPTION OF THE PREFERRED EMBODIMENTS

Each laser, optical amplifier, and amplification method of the present invention is mainly characterized by employing at least one pump light at a wavelength in the range of 0.96 μm to 0.98 μm for the excitation of $Er^{3+}$ from the ground level to the $^4I_{11/2}$ level because of the following reasons.

Figure 1:
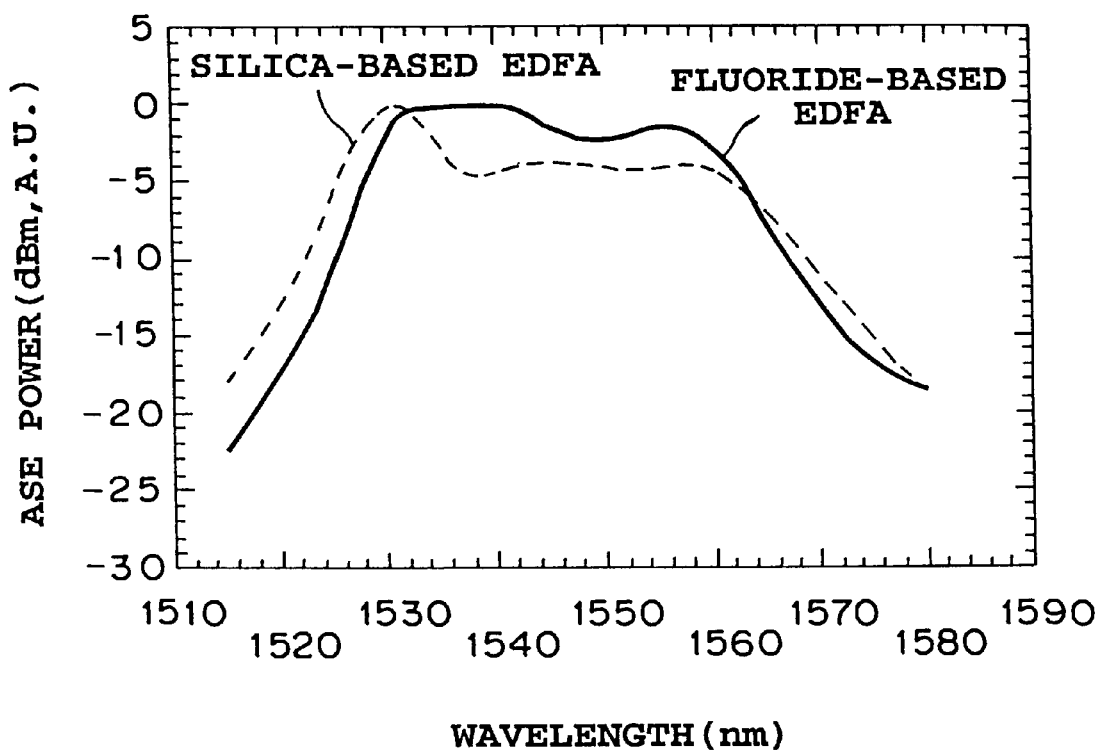
FIG. 1 is a typical amplitude spontaneous emission (ASE) spectrum of the F-EDFA.
Figure 2:
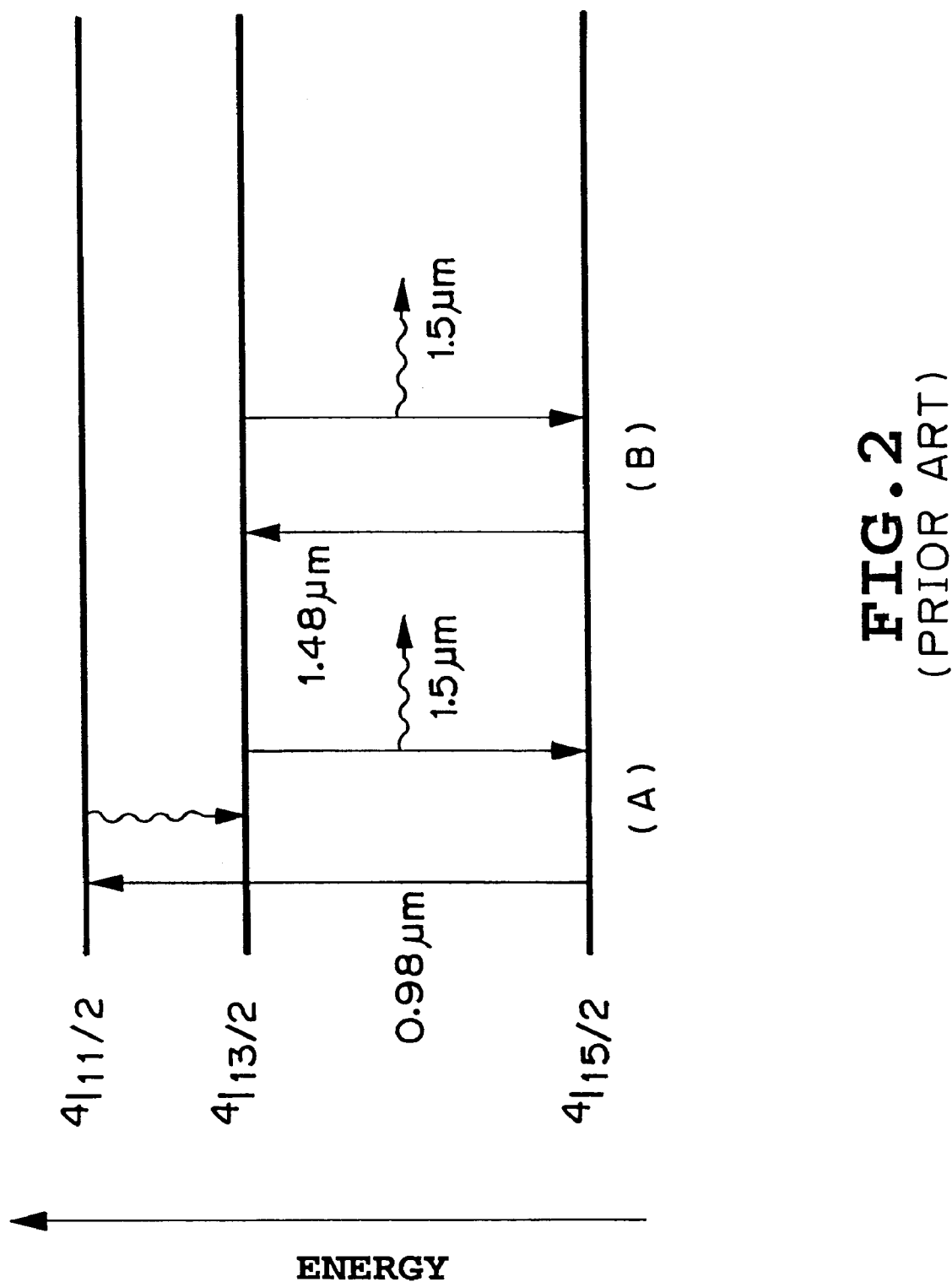
FIG. 2 is an energy diagram of $Er^{3+}$ for the conventional S-EDFA (A) and the conventional F-EDFA (B)
Figure 3:
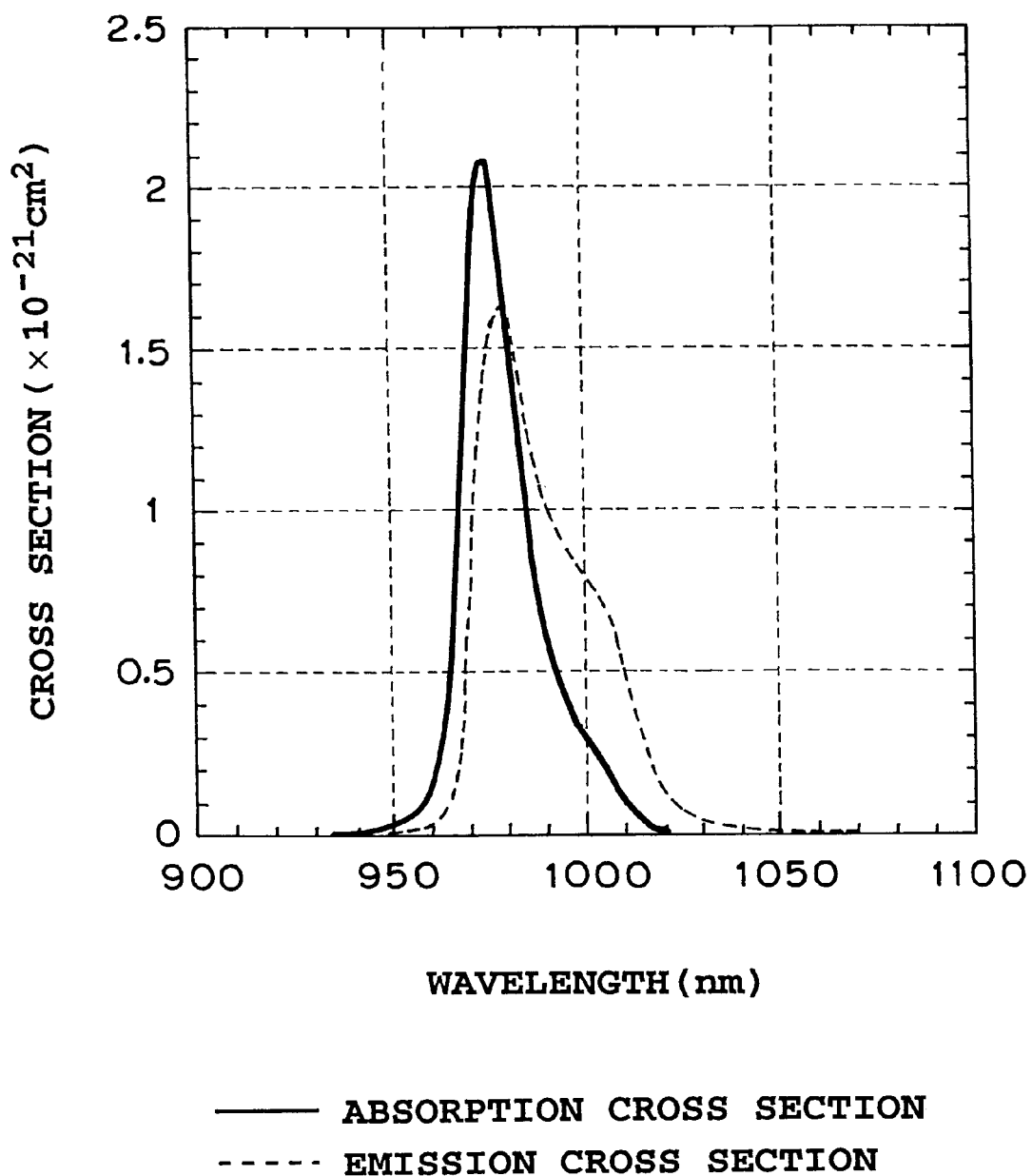
FIG. 3 is a graphical representation of the relationship between the wavelengths and the absorption or emission cross section with respect to the energy state between the $^4I_{15/2}$ level and $^4I_{11/2}$ level.
Figure 4:
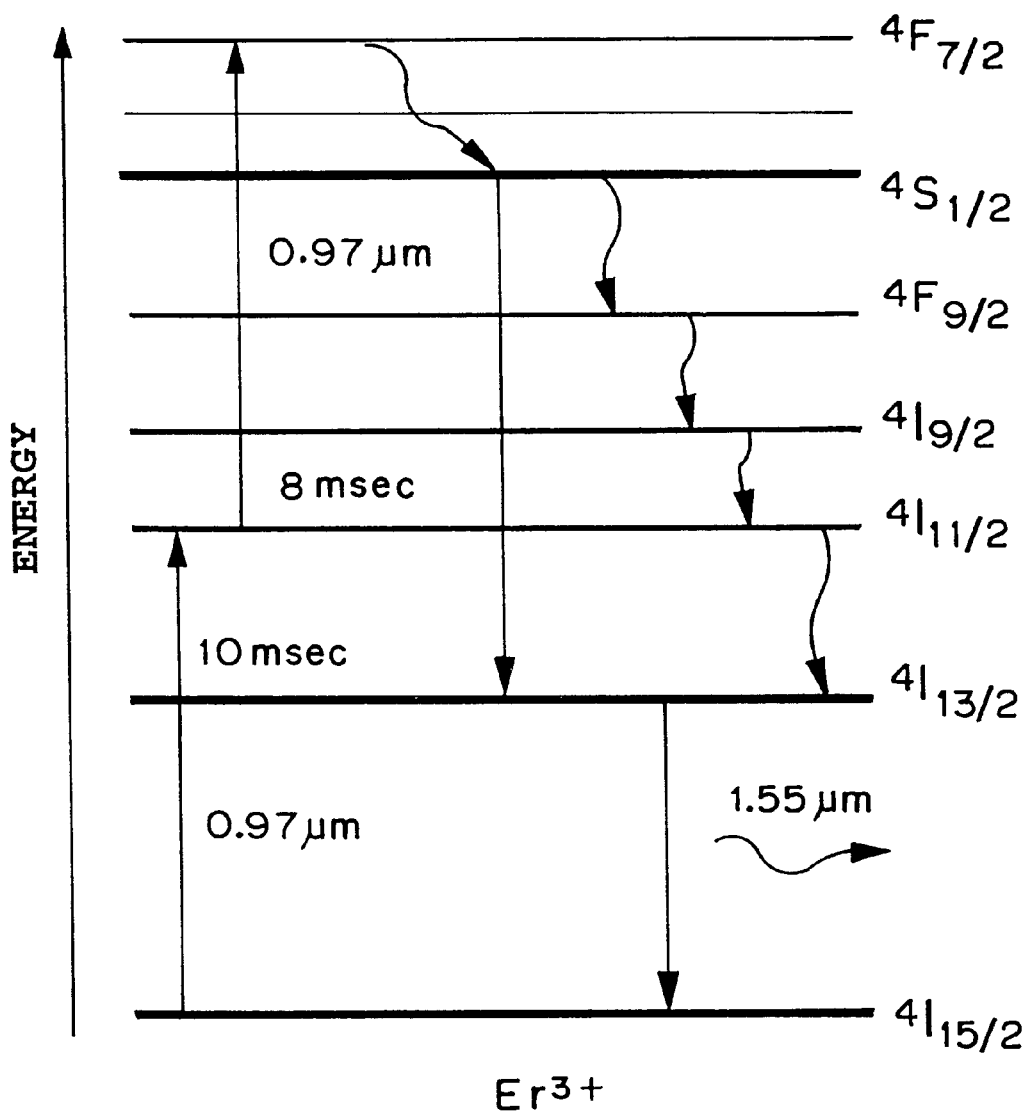
FIG. 4 is an energy diagram of $Er^{3+}$ for the F-EDFA of the present invention.

FIG. 3 is a graph representing the relationship between the pump wavelengths and the cross-sectional areas (in the figure, a full line shows an absorption cross section and a dashed line shows an induced emission cross section) with respect to an energy state between the $^4I_{15/2}$ level and the $^4I_{11/2}$ level. In the wavelength region of over about 980 nm, as shown in the figure, the induced emission cross section area (dashed line) becomes greater than the absorption cross section area(full line). Therefore an induced emission transition from the $^4I_{11/2}$ level to the $^4I_{15/2}$ level tends to occur more strongly compared with an absorption transition from the $^4I_{15/2}$ level to the $^4I_{11/2}$ level in that wavelength region, so that the excitation to the $^4I_{11/2}$ level cannot occur effectively. Alternatively, as clearly in the figure, the excitation to the $^4I_{11/2}$ level can effectively occur by pumping at a wavelength shorter than 980 nm. In this case, on the other hand, the pump ESA (Excited State Absorption) from the $^4I_{11/2}$ level to the $^4F_{7/2}$ level is more likely to take place. As shown in FIG. 4, however, the excitation to the $^4I_{13/2}$ level can be eventually attained because of the step of relaxing from the $^4F_{7/2}$ level to the $^4I_{13/2}$ level.

Embodiment 1

Figure 5:
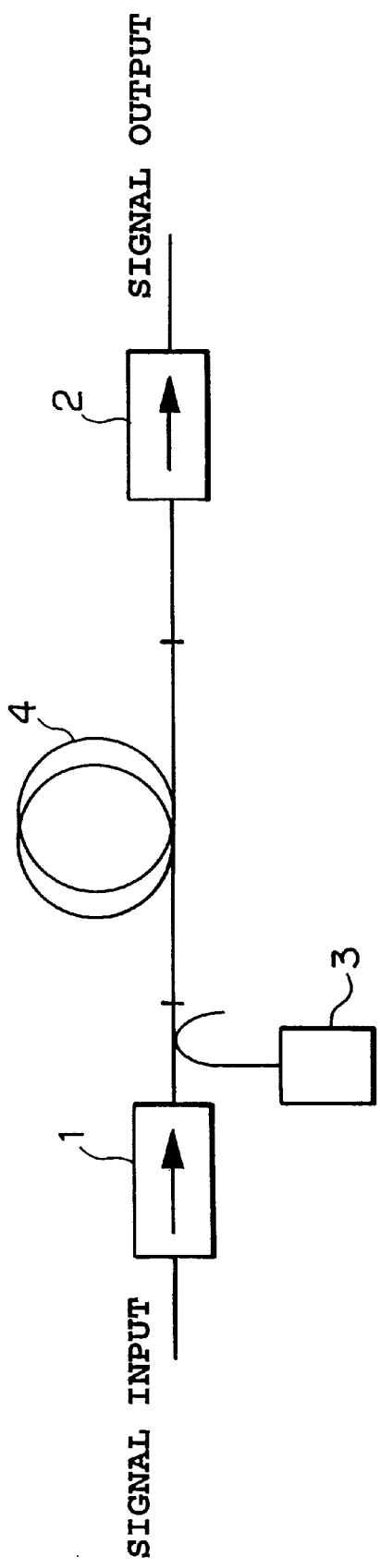
FIG. 5 is a schematic block diagram of an optical amplifier using a $Er^{3+}$-doped $ZrF_4$-based fluoride fiber in accordance with the present invention.
Figure 6:
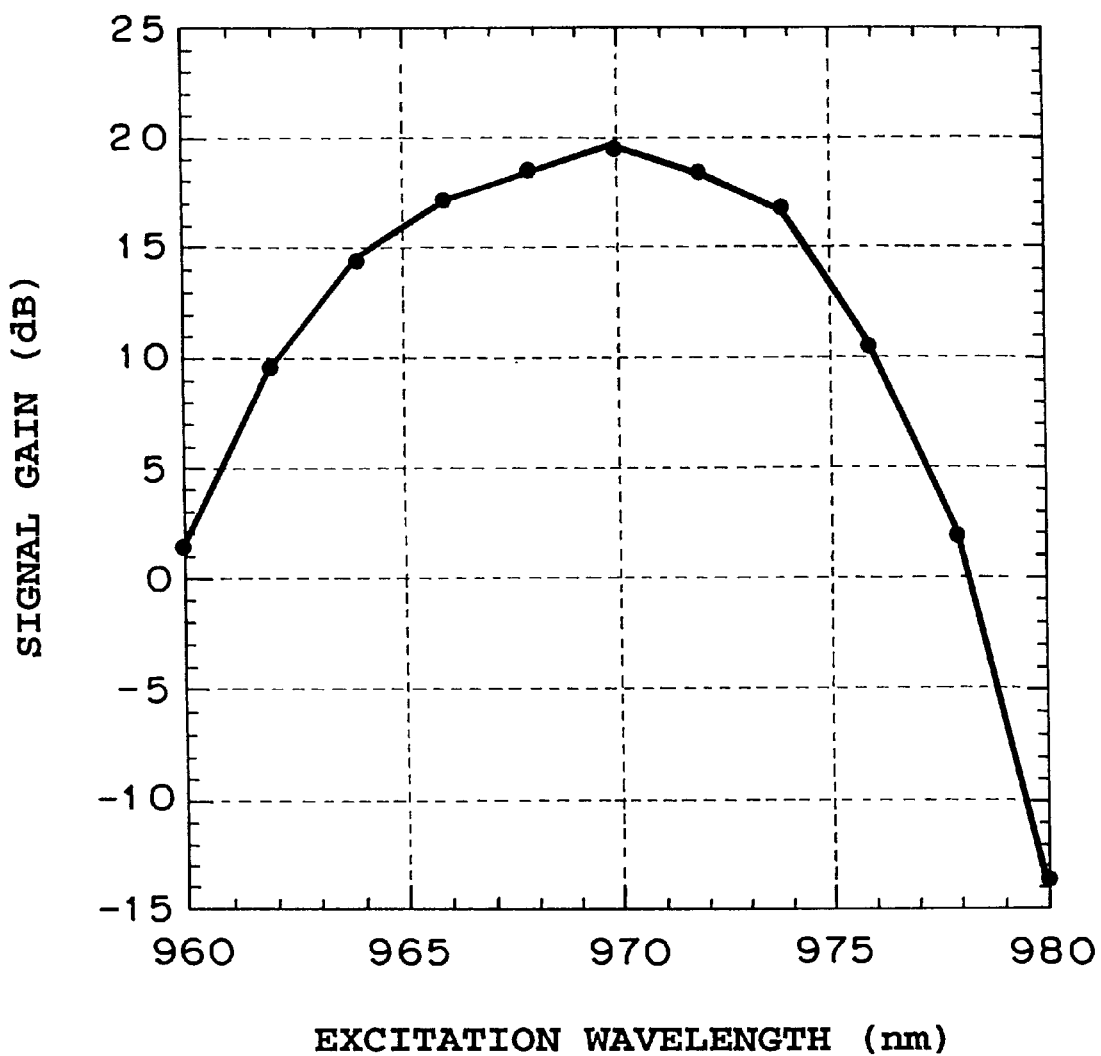
FIG. 6 is a graphical representation of the relationship between the pump wavelengths and the signal gains with respect to the optical amplifier using the $Er^{3+}$-doped $ZrF_4$-based fluoride fiber of FIG. 5.

Referring now to FIG. 5, there is shown a basic configuration of an optical amplifier having an $Er^{3+}$-doped $ZrF_4$-based fluoride fiber as one of the preferred embodiments of the present invention. For a more detailed explanation, an excitation spectrum (illustrating the pump wavelength dependency on the signal gain) of the above fiber is shown in FIG. 6.

The optical amplifier comprises two optical isolators 1, 2, a pump light source 3, and an $Er^{3+}$-doped $ZrF_4$-based fluoride fiber 4 sandwiched between the optical isolators 1, 2. In this embodiment, the fiber 4 is 25 μm in length with a cut-off wavelength of 1 μm, and also the doping concentration of $Er^{3+}$ in its core is 200 ppm. In this embodiment, furthermore, a signal wavelength is 1530 nm, an input signal power is –30 dBm, and the power of the pump light is 60 mW.

Depending on the above configuration of the optical amplifier, the maximum gain can be obtained at a pump wavelength of 970 nm. As shown in FIG. 6, however, a negative gain is observed at a pump wavelength of 980 nm. This wavelength is conventionally used for exciting fibers to the $^4I_{11/2}$ level, and thus we recognize that we cannot obtain the gain at the pump wavelength of 980 nm. Therefore, any wavelength in the range of 960 nm up to 980 nm, preferably in proximity to 970 nm is effective to obtain a gain by exciting a$ZrF_4$-based flouride fiber to the $^4I_{11/2}$ level.

Then the amplification characteristics of the above fiber 4 is investigated by a forward excitation using pump light at a wavelength of 970 nm (i.e., the pump light is launched into the fiber 4 from the upstream side of the fiber 4 by the light source 3). In this case, the input signal power launched into the fiber 4 is –30 dBm. When the pump light power is 132 mW, an obtained gain at a wavelength of 1.53 μm is 30 dB and a noise figure (NF) is 4.5 dB. Also, the NF is 3.5 dB when the wavelength is 1.55 μm. When the above fiber 4 is excited by an pump light with the wavelength of 1.48 μm, an improvement degree of the NF is 1.5 dB or over with reference to the NF at 1.55 µm of 5 dB or over. In addition, we confirmed that the NF was improved (decreased) when the wavelength of the pump light was of any within the range of 960 nm up to 980 nm, compared with that of exciting at 1.48 µm. Furthermore, the NF is improved by the excitation using two or more wavelengths in the range of 960 nm and 980 nm.

Embodiment 2

The same optical amplifier as that of Embodiment 1 is used in this embodiment to measure the NF by introducing WDM signals at eight different wavelengths in the range of 1530 to 1560 nm. The input signal power launched into the optical amplifier is −20 dBm per one wavelength. When the excitation is performed with a total pump light power of 150 mW using the pump wavelength of 970 nm, the observed NF is 5 dB or less by introducing the WDM signals at the wavelengths in the range of 1530 to 1560 nm.

Embodiment 3

In this Embodiment, the amplification characteristics of an optical amplifier are estimated using the same WDM signals as those of Embodiment 2 except of the follows. In this Embodiment, an optical amplifier is the same one as that of Embodiment 1 or 2 except that a bi-directional pump method is used for launching different pump light into the fiber 4. The method comprises the steps of applying pump light at wavelengths in the range of 960 to 980 nm from the front (i.e., the upstream side of the fiber 4 in the same direction as that of the signal light) and simultaneously applying pump light at a wavelength of 1480 nm from the rear (i.e., the downstream side of the fiber 4).

Figure 7:
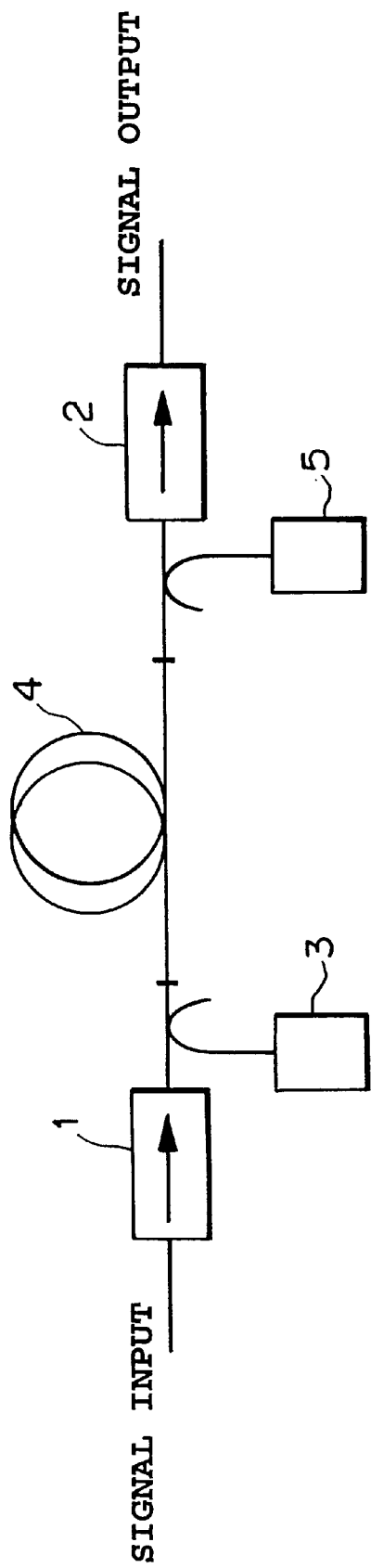
FIG. 7 is a schematic block diagram of an optical amplifier as one of the preferred embodiments of the present invention.

FIG. 7 shows a configuration of the optical amplifier. Comparing with a configuration of the optical amplifier shown in FIG. 5, an additional light source 5 for the excitation to the $^4I_{13/2}$ level is further installed in the optical amplifier and positioned at the downstream side of the $Er^{3+}$-doped fluoride fiber 4. The pump light power for the front is 50 mW, while the pump light power for the rear is in the range of 100 mW to 150 mW. In addition, the optical amplifier shows the NF of 5 dB or less for the wavelengths of 1530 nm to 1560 nm, allowing the gain excursion of 2 dB or less for the signal wavelength.

Embodiment 4

In each of Embodiments 1 to 3 described above, the amplification characteristics of the optical amplifier using the $Er^{3+}$-doped $ZrF_4$-based fluoride fiber as its amplification medium are evaluated. In this Embodiment, an amplification medium as a host of $Er^{3+}$ is selected from the group of an $InF_3$-based fluoride fiber, a chalcogenide glass-based fiber, a $TeO_2$-based fiber, and a PbO-based fiber, instead of the $ZrF_4$-based fluoride fiber to prepare an optical amplifier. Then the optical amplifier having any one of the above fibers is subjected to the same experiments as those of Embodiments 1 to 3 to evaluate its amplification characteristics. As a result, the optical amplifier having any one of the fibers listed above as the amplification medium shows the NF of 5 dB or less.

Consequently, as explained above, Embodiments 1 to 4 allow the amplification of 1.55 µm band by the excitation to the $^4I_{11/2}$ level which enables to achieve a low noise amplification whether an infrared-transparent fiber such as a fluoride one (which is regarded as an improper medium by persons skilled in the art) is used as a host of $Er^{3+}$. Hence, the optical amplifier having the characteristics of a flat gain with a wide amplification bandwidth and a low noise is obtained. The optical amplifier thus obtained can be applied in a communication system to increase a transmission volume thereof and to provide a diversification of the system configuration to achieve the wide dispersion of an optical communication, the substantial reduction in a manufacturing cost thereof, and so on.

Embodiment 5

Figure 8:
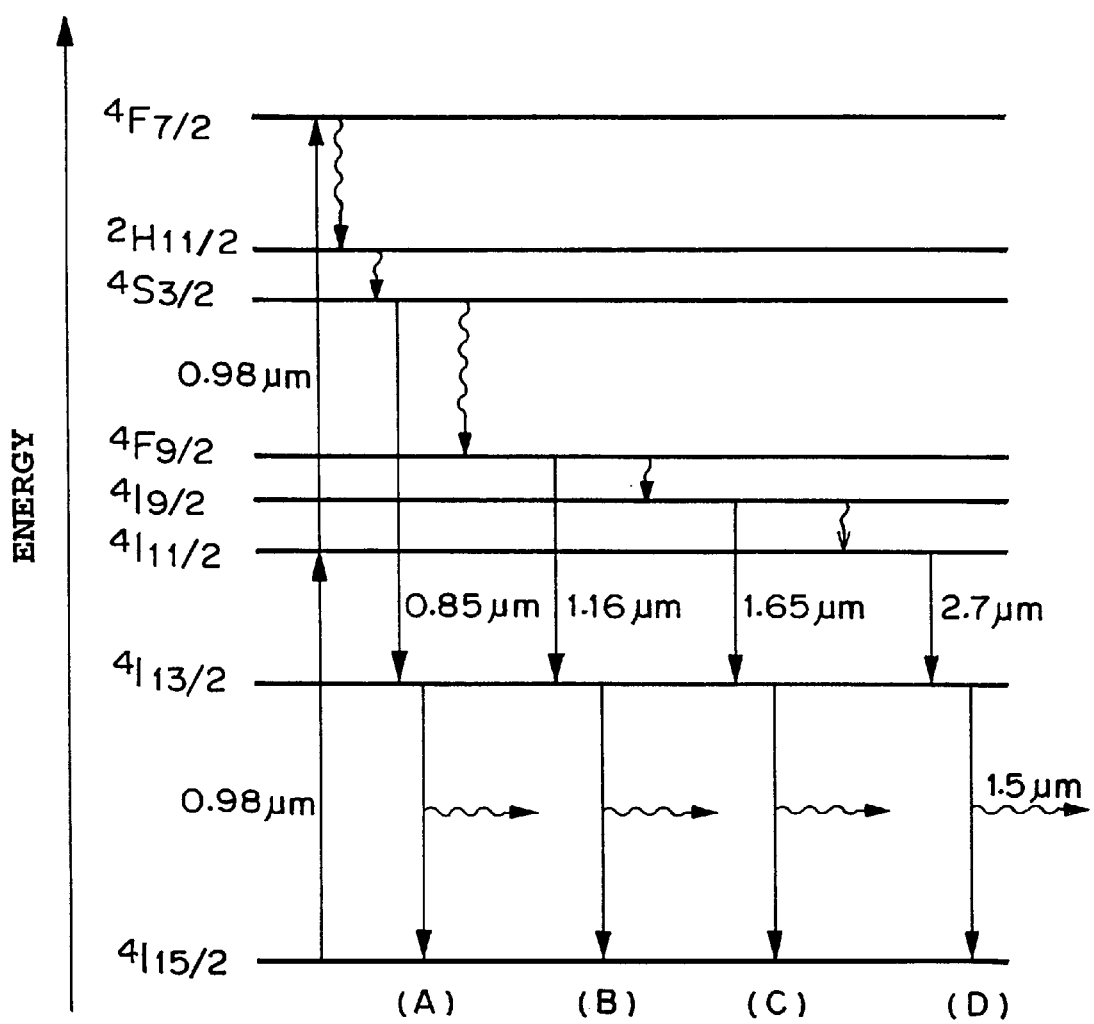
FIG. 8 is an energy diagram of $Er^{3+}$ to be applied in the lasers and the optical amplifiers of the present invention, where (A), (B), (C), and (D) show different excitation ways of the $Er^{3+}$.

An optical amplifier of the present embodiment is constructed so as to introduce at least one light as a third light corresponding to a difference between the $^4I_{13/2}$ level and the upper level into the $Er^{3+}$-doped fiber in addition of the pump light and the signal light. Energy levels of $Er^{3+}$ ions to be applied on the present embodiment will be described in detail with reference to FIG. 8. In this figure, (A) to (D) are illustrated for the purpose of explaining the different excitation ways of the $Er^{3+}$ ions to the different energy levels. As shown in the figure, a pump excited state absorption (pump ESA) of the pump light by the transition from the $^4I_{11/2}$ level to the $^4I_{15/2}$ level occurs when the $Er^{3+}$ ions are excited by the 0.98 µm pump light, resulting in the excitation to the $^4F_{7/2}$ level. Then a phonon emitted relaxation from the $^4F_{7/2}$ level to the $^4S_{3/2}$ level occurs. It means that a part of the $Er^{3+}$ ions is pumped to the $^4S_{3/2}$ level. If an induced emission from the $^4S_{3/2}$ level to the $^4I_{13/2}$ level occurs by launching light corresponding to the energy difference between the $^4S_{3/2}$ level and the $^4I_{13/2}$ level at a wavelength of 0.85 µm into the amplifier, a population density of the $^4S_{3/2}$ level can be reduced while a density of excited state of the $^4I_{13/2}$ level can be increased. Consequently, as shown in FIG. 8 (A), a gain efficiency of the optical amplifier can be improved as a result of increasing the density of inverted population in which the number of the $Er^{3+}$ ions at the $^4I_{13/2}$ level (i.e., the higher energy level) exceed those at the $^4I_{15/2}$ level (i.e., the lower energy level). Energy levels to be excited by the pump ESA include not only the $^4S_{3/2}$ level (as described above) but also the $^4I_{9/2}$ level and the $^4F_{9/2}$ level as shown in FIG. 8 (C) and (B), respectively. In addition, the $^4I_{11/2}$ level to be directly excited at a wavelength of 0.98 µm has a large excited state density as shown in FIG. 8 (D). Therefore, an excited state density of the $^4I_{13/2}$ level can be increased by launching the light having the energy difference between the $^4I_{13/2}$ level and the $^4I_{9/2}$, $^4F_{9/2}$, or $^4I_{11/2}$ level at a wavelength of 1.65, 1.16, or 2.7 µm, respectively, just as in the case of launching the light at a wavelength of 0.85 µm into the fiber. In accordance with the present embodiment, therefore, the 0.98 µm pump light which is generally used in the conventional S-EDFA to attain a favorable amplification gain may be applied in the F-EDFA in order to realize lower noise amplification and higher amplification gain of the F-EDFA, compared with those of the conventional F-EDFA.

Figure 9:
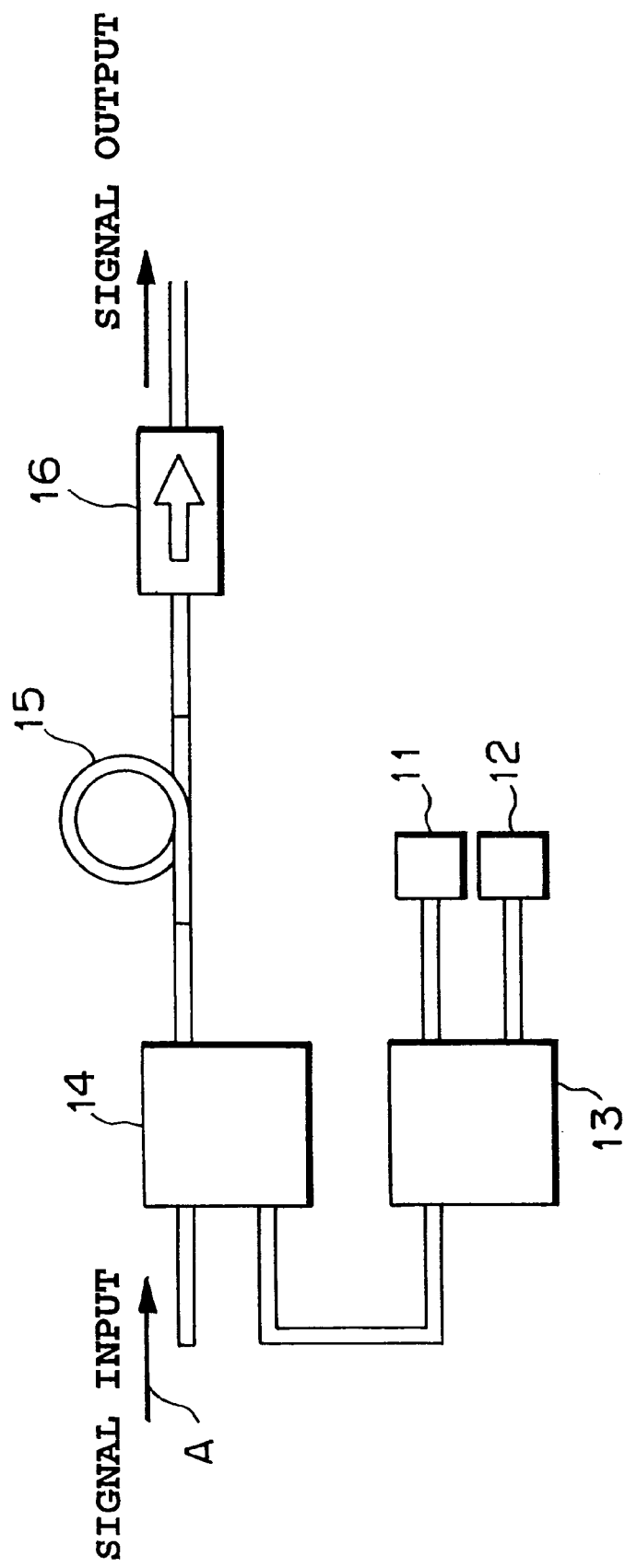
FIG. 9 is a schematic block diagram of an optical amplifier as one of the preferred embodiments of the present invention.

FIG. 9 is a block diagram to illustrate the construction of an optical amplifier of the present Embodiment. In the figure, reference numerals 11 and 12 denote pump light sources, 13 and 14 denote optical couplers, 15 denotes an optical fiber doped with $Er^{3+}$, and 16 is an optical isolator. In addition, the arrows in the diagram indicate the direction of an input and an output of the signal, respectively. That is, an output of the signal (laser oscillation) is in the direction of the arrows. In this Embodiment, a semiconductor laser of 0.98 µm oscillation is used as the optical source 11, while a semiconductor laser of 0.85 µm oscillation is used as the optical source 12. Pump light from the light source 11 and pump light from the light source 12 are coupled together-by the optical coupler 13. Then the coupled pump light from the optical coupler 13 is further coupled to an input signal in the direction of the arrow A by the optical coupler 14. Then output light from the optical coupler 14 is launched into the $Er^{3+}$-doped optical amplification fiber 15 of 10 m in length having a glass composition of $ZrF_4$-$BaF_2$-$LaF_3$-$YF_3$-$AlF_3$-$PbF_2$-$LiF$-$HfF_4$. In this embodiment, the fiber 15 also has a core of 2.5 μm in diameter being doped with 1,000 ppm $Er^{3+}$ and a cut-off wavelength of 1 μm. A gain of 5 dB is obtained at a wavelength of 1.55 μm when 200 mW power pump light at a wavelength of 0.98 μm is only launched into the amplifier. In addition, a gain of 30 dB is obtained at a wavelength of 1.55 μm when 50 mW power pump light at a wavelength of 0.85 μm is only launched into the amplifier. In this case, the amplifier is further subjected to the NF measurement and it results in the NF of 4 dB.

A NF value of the optical amplifier using the $Er^{3+}$-doped fluoride fiber of the present embodiment by the pump light at a wavelength of 1.48 μm is measured and it results in the NF of 6 dB when the gain is 30 dB at a wavelength of 1.55 μm. Using the $Er^{3+}$-doped fluoride fiber of the present embodiment to obtain a value of the NF by an excitation at 1.48 μm wavelength, the NF of 6 dB is obtained when the gain is 30 dB at a wavelength of 1.55 μm. Consequently, the present embodiment attains the high gain of 30 dB which cannot be attained by the conventional optical amplifier with the excitation at a wavelength of 0.98 μm. In addition, the present embodiment attains about 2 dB reduction in the NF compared with that of obtained by the excitation at a wavelength of 1.48 μm, so that the 0.97 μm pump $Er^{3+}$-doped fluoride fiber amplifier of the present embodiment shows substantially the same NF value as that obtained by the 0.98 μm pump SEDFA.

Embodiment 6

In Embodiment 5, the incident light at a wavelength of 0.85 μm is used as one corresponding to the transition from the $^4S_{3/2}$ level to the $^4I_{13/2}$ level. In this embodiment, on the other hand, light at a wavelength of 2.7 μm as one corresponding to the transition from the $^4I_{11/2}$ level to the $^4I_{13/2}$ level is launched from a YAG laser 12 into the amplifier for the purpose of increasing a population of the $^4I_{13/2}$ level by directly decreasing a population of the $^4I_{11/2}$ level excited at a wavelength of 0.98 μm as a result of an induced emission caused by the transition from the $^4I_{11/2}$ level to the $^4I_{13/2}$ level. In this case, comparing with those of only the 0.98 μm pump light, an increase in the gain at a wavelength of 1.55 μm and a decrease in the NF are observed. Besides, the amplification characteristics of the amplifier can be improved by launching light at a wavelength of 1.16 μm into the fiber by means of a semiconductor laser as light source 12.

Embodiment 7

In this embodiment, a light at a wavelength of 1.65 μm from a light source (i.e., semiconductor laser) 12 is used as one corresponding to the transition from the $^{4\prime}I_{9/2}$ level to the $^4I_{13/2}$ level.

In this case, comparing with those of only the 0.98 μm excitation, an increase in the gain at a wavelength of 1.55 μm and a decrease in the NF are observed.

In Embodiment 6 and Embodiment 7, as described above, the light source 12 emits the incident light at a wavelength of 0.85, 2.7, 1.16, or 1.65 μm. It is noted that there is a width of the transition energy from the $^4S_{3/2}$, $^4I_{9/2}$, or $^4I_{11/2}$ level to the $^4I_{13/2}$ level. Thus, the incident light in the energy width launched from the light source 12 can be effective.

The available light source 12 may be not only selected from semiconductor lasers and solid state lasers such as an Er:YAG laser but also selected from fiber lasers such as an $Er^{3+}$-doped fluoride fiber laser as a light source of emitting light at a wavelength of 2.7 μm.

In addition to the above three energy levels $^4S_{3/2}$, $^4I_{9/2}$, and $^4I_{11/2}$, there are other energy levels (not shown) higher than the $^4I_{13/2}$ level. Thus, it is possible to improve the amplification characteristics of the amplifier by incident light having an energy corresponding to the energy difference between the higher energy level and the $^4I_{13/2}$ level.

Furthermore, the light for the transition from the higher energy level to the $^4I_{13/2}$ level is not limited to one type. A plurality of light beams at different wavelengths may be launched into the amplifier simultaneously with the pump light. The pump light may be responsible for the direct excitation to an energy level higher than the $^4I_{9/2}$ level, for example the direct excitation from the $^4I_{9/2}$ level to the $^4S_{3/2}$ level.

Embodiment 8

In Embodiments 5 to 7 described above, the $Er^{3+}$-doped $ZrF_4$-based fluoride fiber is used as the amplification medium. It is also known that a gain at a wavelength of 1.55 μm is hardly obtainable when the 0.98 μm pump (the excitation to the $^4I_{11/2}$ level) is applied in an amplifier where one of an $Er^{3+}$-doped $ZrF_4$-$AlF_2$ based fluoride fiber, an $Er^{3+}$-doped $InF_3$ based fiber, an $Er^{3+}$-doped chalcogenide glass fiber, and an $Er^{3+}$-doped telluride glass fiber is provided as the amplification medium. In this embodiment, therefore, an effective use of any one of those amplification media in which a material with a low phonon energy is used as a host can be attained in accordance with the present invention.

Also, an excitation to an energy level higher than the $^4I_{11/2}$ is not limited to the 0.98 μm pump. This excitation can be also attained by the 0.8 μm pump (the excitation to the $^4F_{9/2}$ level). In this case, an increase in the gain at a wavelength of 1.55 μm and a decrease in the NF are obtained by launching the 0.8 μm pump light into the fiber simultaneously with additional incident light (i.e., light at a wavelength of 0.8 μm) having an energy corresponding to the transition from an energy level higher than the $^4I_{13/2}$ level to the $^4I_{13/2}$ level.

Embodiment 9

Figure 10:
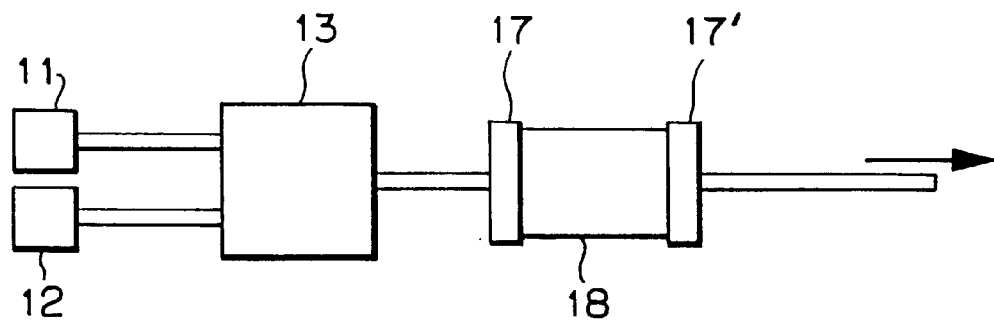
FIG. 10 is a schematic block diagram of a laser as one of the preferred embodiments of the present invention.

FIG. 10 is a schematic block diagram of a laser as one of the preferred embodiments of the present invention. In the figure, reference numerals 11 and 12 denote light sources, 13 denotes an optical coupler, 17 and 17' denote resonance mirrors, and 18 denotes a crystal as an amplification medium. In addition, an arrow indicates the direction of a signal output. A crystal to be used as the amplification medium is one of $Er^{3+}$-doped halide crystals such as $LaF^3$, $BaF^2$, $LaC^{13}$, and $YF^3$. In this embodiment, the characteristics of 1.5 μm amplification and laser oscillation of the laser using the halide crystal are investigated. As a result, an increase in the gain and an increase in the efficiency of laser oscillation are obtained when the light for the induced emission from an higher energy level to the $^4I_{13/2}$ level is launched in the fiber simultaneously with pump light at the wavelengths of 0.8 and 0.98 μm.

Embodiment 10

Figure 11:
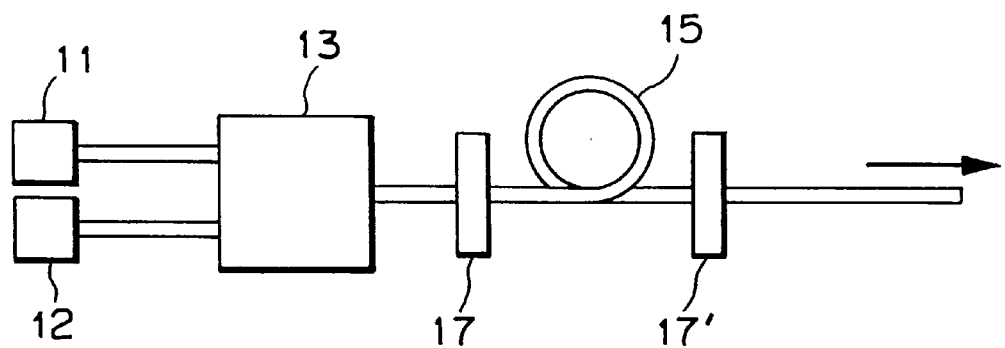
FIG. 11 is a schematic block diagram of a laser as one of the preferred embodiments of the present invention.

FIG. 11 is a schematic block diagram of a laser as another preferred embodiment of the present invention. In the figure, reference numerals 11 and 12 denote light sources, 13 denotes an optical coupler, 15 denotes an $Er^{3+}$-doped optical fiber 15 for the amplification, and 17 and 17' denote resonance mirrors. In addition, an arrow indicates the direction of an output (laser oscillation). The $Er^{3+}$-doped optical fiber is prepared so as to include a glass composition of $ZrF_4$-$BaF_2$-$LaF_3$-$YF_3$-$AlF_3$-$PbF_2$-$LiF$-$HfF_4$ and incorporated in the laser shown in FIG. 11, resulting in a laser oscillation at a wavelength of 1.5 μm. In this embodiment, light sources of 0.98 and 0.85 μm wavelengths were used as the pump light sources 11, 12. When a pass of light from the light source of 0.85 μm wavelength is blocked, the strength of the laser oscillation is remarkably decreased.

Embodiment 11

Figure 12:
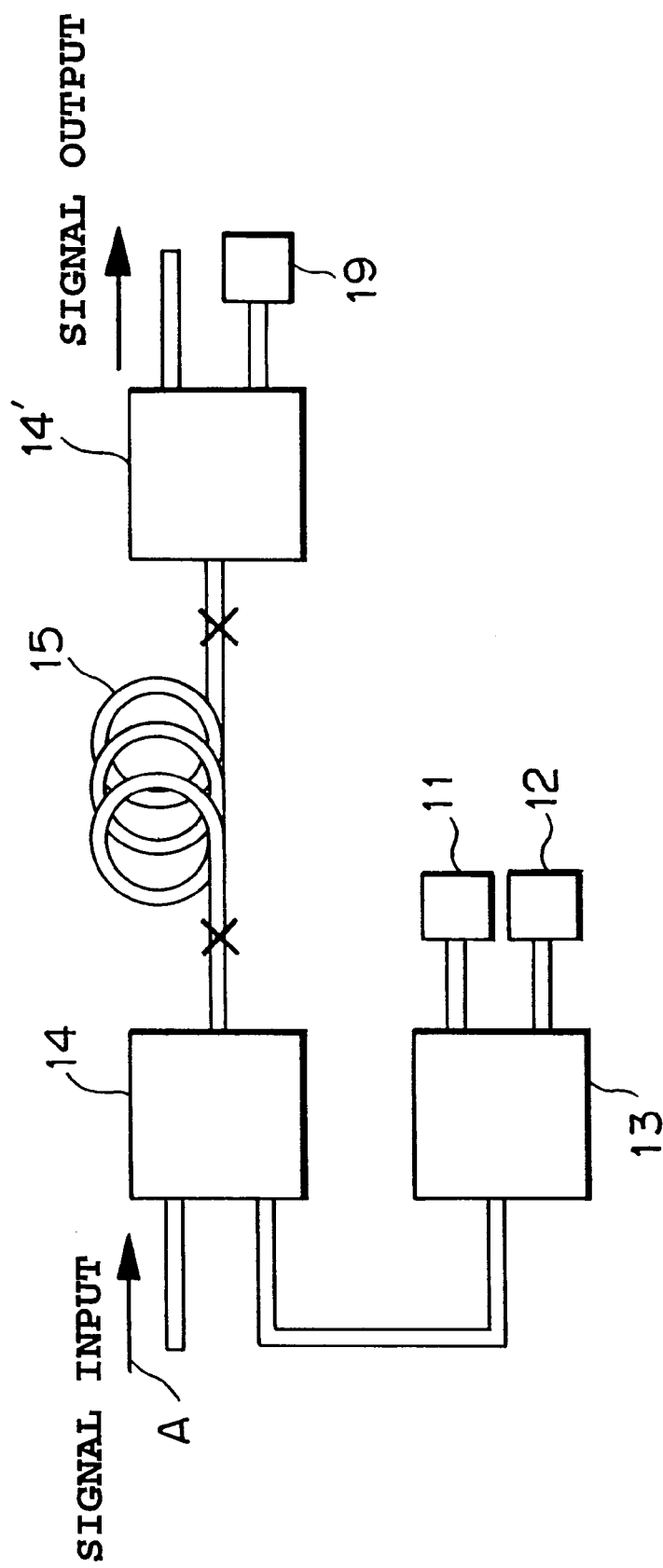
FIG. 12 is a schematic block diagram of an optical amplifier as one of the preferred embodiments of the present invention.

FIG. 12 is a schematic block diagram of a laser as another preferred embodiment of the present invention. In the figure, a reference numeral 11 denotes a light source consisting of a semiconductor laser of 0.98 μm oscillation, 12 denotes a light source consisting of a semiconductor laser of 0.85 μm oscillation, 13, 14 and 14u denote optical couplers, and 15 denotes an $Er^{3+}$-doped optical amplifier for the amplification.

After coupling the pump light from the light sources 11 and 12 together by the optical coupler 13, output pump light produced from the optical coupler 13 is coupled to an incident signal light provided from the direction indicated by an arrow A in the figure by the optical coupler 14. Furthermore, the pump light from the light source 19 is launched into the $Er^{3+}$-doped optical fiber 15 through the optical coupler 14'.

The $Er^{3+}$-doped optical fiber 15 provided as an amplification medium in the present embodiment is prepared so as to have the same glass composition as that of Embodiment 10, i.e., $ZrF_4$-$BaF_2$-$LaF_3$-$YF_3$-$AlF_3PbF_2$-$LiF$-$HfF_4$. In addition, the fiber 15 is of an $Er^{3+}$-doped concentration of 1,000 ppm, a length of 10 m, a high relative refractive-index difference of 2.5%, and a cut-off wavelength of 1μm. When the pump light at a wavelength of 0.98 μm is only launched into the fiber for 200 mW, the gain at a wavelength of 1.5 μm is 5 dB. When the pump light at a wavelength of 0.85 μm is launched into the fiber for 30 mW, the gain at a wavelength of 1.55 μm is 15 dB. When an additional pump light at a wavelength of 1.48 μm is launched into the fiber in addition to the pump light of 0.85 μm wavelength, the gain at a wavelength of 1.55 μm is 40 dB. In this case, a measured value of the NF of the amplifier is 3.8 dB.

Furthermore, the NF of the amplifier comprising the $Er^{3+}$-doped optical fiber of the present embodiment is also measured by an excitation at a wavelength of 1.48 μm. The NF of 6 dB is obtained when the gain at a wavelength of 1.55 μm is 40 dB. Consequently, a configuration of the amplifier of the present embodiment enables to provide an amplifier having an excellent gain of 40 dB which has not been attained by the 0.98 μm pump conventional amplifier, together with a decrease in the NF, i.e., 2 dB or less dropped from that of the 1.48 μm pump. We confirm that the NF of the amplifier of the present Embodiment is substantially the same level as that of the 0.98 μm pump S-EDFA.

Embodiment 12

In Embodiment 11, the light of 0.85 μm wavelength is used as the light corresponding to the transition from the $^4S_{3/2}$ level to the $^4I_{13/2}$ level. In this embodiment, on the other hand, the light corresponding to the transition from the $^4I_{11/2}$ level to the $^4I_{13/2}$ level is launched into the fiber from the light source 12 (i.e., an Er:YAG laser of 2.7 μm oscillation is used as the light source). In this case, an increase in the gain at a wavelength of 1.55 μm and a decrease in the NF of the amplifier are observed. The amplification characteristics of the amplifier is also improved by launching the incident light at a wavelength of 1.16 μm into the amplification medium from a semiconductor being provided as the light source 12.

Embodiment 13

In Embodiment 11, light at a wavelength of 0.85 μm corresponding to the transition from the $^4S_{3/2}$ level to the $^4I_{13/2}$ level is launched into the amplifier. In Embodiment 12, furthermore, light corresponding to the transition from the $^4I_{11/2}$ level to the $^4I_{13/2}$ level is launched into the amplifier from the light source 12. In the present embodiment, on the other hand, light at a wavelength of 1.65 μm corresponding to the transition from the $^4I_{9/2}$ level to the $^4I_{13/2}$ level is launched into the amplifier from the light source 12 (semiconductor laser). In this case, an increase in the gain at a wavelength of 1.55 μm and a decrease in the NF are observed, compared with those of the 0.98 μm excitation by itself.

In Embodiments 11 to 13 as described above, the light source 12 emits the incident light at a wavelength of 0.85, 2.7, 1.16, or 1.65 μm. It is noted that there is a width of the transition energy from the $^4S_{3/2}$, $^4I_{9/2}$, or $^4F_{9/2}$, or $^4I_{11/2}$ level to the $^4I_{13/2}$ level. Thus, it is needless to say that the incident light in the energy width launched from the light source 12 can be effective.

The available light source 12 may be not only selected from semiconductor lasers and solid state lasers such as an Er:YAG laser but also selected from fiber lasers such as an $Er^{3+}$-doped fluoride fiber laser as a light source of emitting a light a wavelength of 2.7 μm.

In addition to the above three energy levels: $^4S_{3/2}$, $^4I_{9/2}$, and $^4I_{11/2}$ there are other energy levels (not shown) higher than the $^4I_{13/2}$ level. Thus, it is possible to improve the amplification characteristics of the amplifier by incident light having an energy corresponding to the energy difference between the higher energy level and the $^4I_{13/2}$ level.

Furthermore, the number of lights for the transition from the higher energy level to the $^4I_{13/2}$ level is not limited to one type. A plurality of lights at different wavelengths may be launched into the amplifier simultaneously with the pump light. The pump light may be for the direct excitation to an energy level higher than the $^4I_{9/2}$ level, for example the $^4F_{9/2}$ level and the $^4S_{3/2}$ level.

Embodiment 14

In the present embodiment, as shown in FIG. 9, an optical amplifier having two light sources 11 and 12 is prepared, where the light source 11 is a semiconductor laser that oscillates at a wavelength of 0.97 μm and the light source 12 is a semiconductor laser that oscillates at a wavelength of 0.855 μm. After coupling pump light from the light sources 11 and 12 by an optical coupler 13, output pump light from the coupler 13 passes through another optical coupler 14 where it is further coupled to incident signal light provided from an optical isolator (not shown) in the direction indicated by an arrow A in the figure. Then output pump light from the optical coupler 14 is launched into an $Er^{3+}$-doped optical fiber 15 for the amplification of the pump light.

The above $Er^{3+}$-doped optical fiber 15 has a glass composition of $ZrF_4$-$BaF_3$-$LaF_3$-$YF_3$-$AlF_3$-$PbF_2$-$LiF$-$NaF$-$HfF_4$ and its core is doped with $Er^{3+}$ in an amount equal to 1,000 ppm. In addition, the fiber 10 is prepared as one having a length of 10 m, a difference in refractive indexes between the core portion and the cladding portion of 2.5%, and a cut-off wavelength of 1 $\mu$m. In this embodiment, furthermore, a gain of 40 dB can be attained when additional light at a wavelength of 0.855 $\mu$m with a power of 10 mW is simultaneously launched into the fiber in addition to the 0.97 $\mu$m pump light. At this time, a NF of 3.8 dB is obtained.

The amplifier system of the present embodiment uses the process of exciting to the $^4I_{13/2}$ level including the steps of: a two-stage excitation in which the $^4I_{15/2}$ level is excited to the $^4I_{11/2}$ level and then the $^4I_{11/2}$ level is excited to the $^4F_{7/2}$ level; and an induced transition from the $^4S_{3/2}$ level to the $^4I_{13/2}$ level. Therefore appropriate pump wavelengths should be selected for effectively performing the above two-stage excitation at first to attain the excitation to the $^4I_{13/2}$ level.

Figure 13:
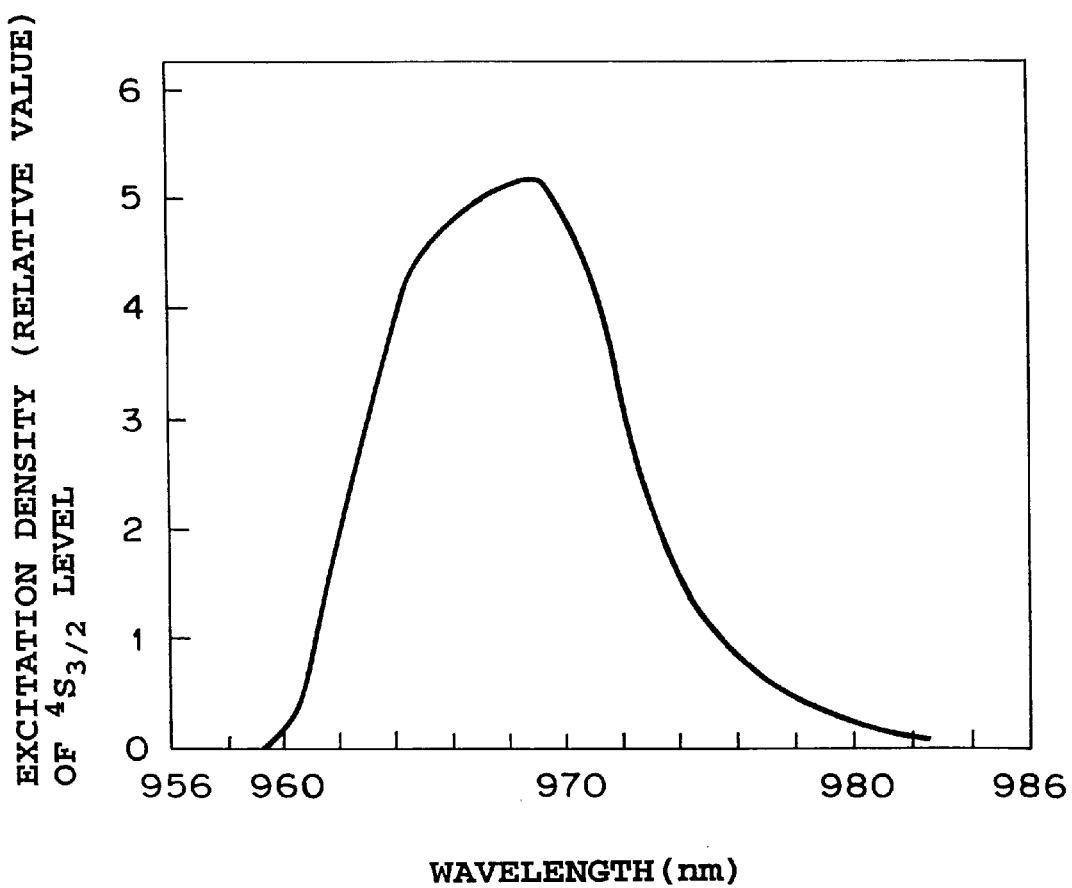
FIG. 13 is a graphical representation of the relationship between the pump wavelengths and the excitation densities of the $^4S_{3/2}$ level.

FIG. 13 shows the changes in an excitation density of the $^4S_{3/2}$ by shifting the pump wavelength. The results shown in the figure are obtained by the changes in an emitting strength of the amplifier at the transition from the $^4S_{3/2}$ level to the $^4I_{13/2}$ level. As shown in FIG. 13, the $Er^{3+}$-doped fluoride fiber can be excited effectively to the $^4S_{3/2}$ level at a pump wavelength in the range of 960 nm to 980 nm, and especially a high efficient excitation to the $^4S_{3/2}$ level can be attained at a pump wavelength of approximately 969 nm.

Figure 14:
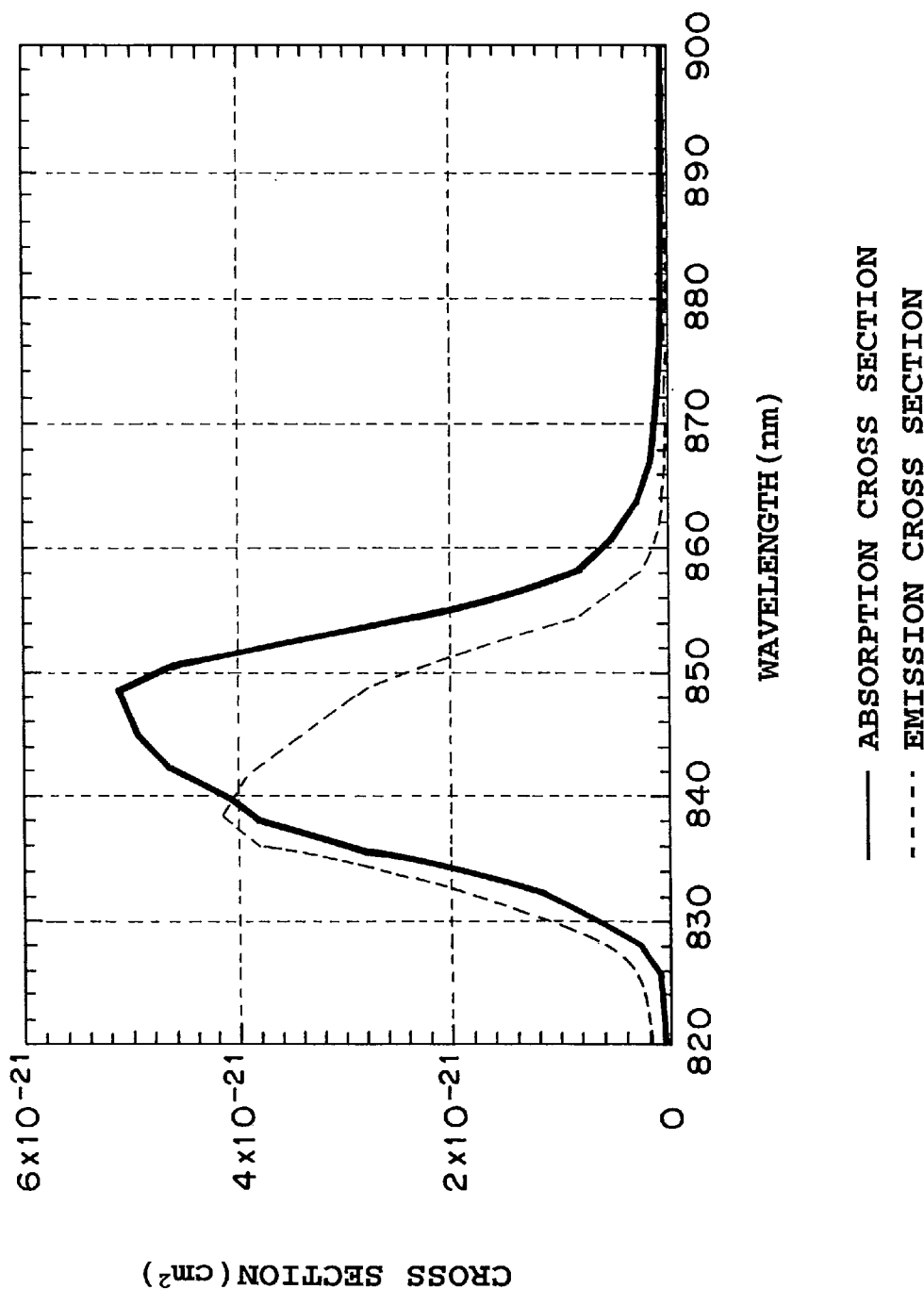
FIG. 14 is a graphical representation of the relationship between the wavelengths and the absorption or emission cross section with respect to the energy state between the $^4S_{3/2}$ level and $^4I_{13/2}$ level.

For the light responsible for an induced emission from the $^4S_{3/2}$ level to the $^4I_{13/2}$ level, a pump wavelength thereof may be selected from 0.82 $\mu$m to 0.88 $\mu$m because of an emitted cross section of the transition from the $^4S_{3/2}$ level to the $^4I_{13/2}$ level is in existence as shown FIG. 14. In the wavelength region of 0.84 $\mu$m to 0.88 $\mu$m, the induced emission cross section is greater than the absorption cross section, so that it is possible to attain an induced emission from the $^4S_{3/2}$ level to the $^4I_{13/2}$ level with efficiency using the light at a wavelength in the above region.

Embodiment 15

In this embodiment, as shown in FIG. 12, an $Er^{3+}$-doped fluoride fiber amplifier (F-EDFA) is prepared by installing a third light source 19 in addition to the light sources 11, 12 used in the F-EDFA of Embodiment 5 (see FIG. 9). In addition, an additional optical coupler 14' is installed instead of the optical isolator 16 so as to be connected to the third light source 19. Thus another pumping light can be launched in the $Er^{3+}$-doped fiber 5 through the optical coupler 4' in the downstream part of the F-EDFA. In this embodiment, furthermore, the light at a pump wavelength of 1.48 $\mu$m is used. Therefore, the F-EDFA of the present embodiment is configured to incorporate an additional excitation at a wavelength of 1.48 $\mu$m for performing a direct excitation to the $^4I_{13/2}$ level to attain a low noise figure (NF) and a high-output whether a large signal is launched into the F-EDFA.

In the case of using an $Er^{3+}$-doped silica fiber, an amplifier (i.e., an $Er^{3+}$-doped silica fiber amplifier: S-EDFA) having the properties of producing a high-output and a low noise figure (NF) can be constructed by incorporating the means of launching a pump light at a wavelength of 0.98 $\mu$m from the upstream to the fiber and the means of launching pump light at a wavelength of 1.48 $\mu$m from the downstream of the fiber. In the case of using the $Er^{3+}$-doped fluoride fiber, on the other hand, two different pump light beams at wavelengths of 0.97 and 0.855 $\mu$m are simultaneously launched in the fiber so as to avoid a serious degradation of an efficiency of exciting to the $^4I_{13/2}$ level to be caused by launching only the pump light at a wavelength of 0.97 $\mu$m into the fiber.

An amplification gain of 15 dB or more and a NF of 5 dB or less are obtained at a wavelength in the above wavelength region by performing the excitation when a pump power of the 0.97 $\mu$m pump light launched into the fiber is 100 mW and a pump power of the 0.85 $\mu$m pump light launched into the fiber is 20 mW. The signal light input is performed through an optical amplifier (not shown in FIG. 13).

Therefore, the excitation method in accordance with the present embodiment improves the amplification characteristics of the F-EDFA, so that it is effective to construct an amplifier having the properties of producing a high-output with a low noise.

Embodiment 16

Figure 15:
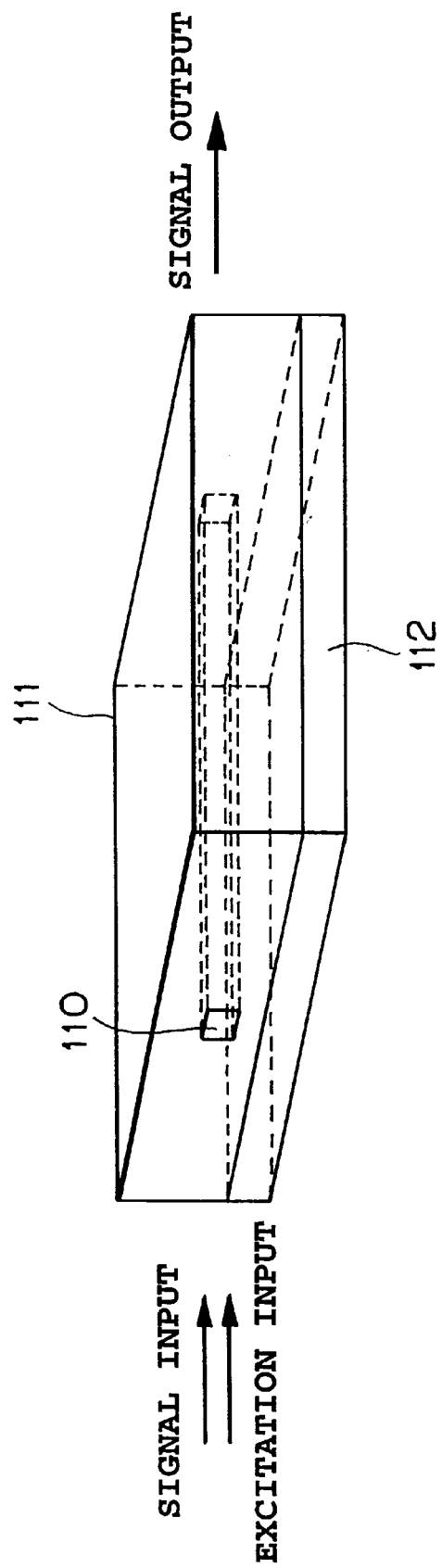
FIG. 15 is a perspective diagram of a main portion of an optical amplifier in the type of an optical waveguide as one of the preferred embodiments of the present invention.

FIG. 15 is a perspective diagram of a main constructed portion of an optical amplifier in the type of an optical waveguide in accordance with the present invention. In the figure, a reference numeral 110 denotes a core portion, 111 denotes a cladding portion, and 113 denotes a substrate portion. In this embodiment, the core and cladding portions are made of a fluoride glass. In addition, the core portion 110 is doped with 110% by weight of $Er^{3+}$.

In this embodiment, composite light consisting of the light at a wavelength of 1.48 $\mu$m and the light at a wavelength of 0.86 $\mu$m is launched into the core portion 110.

If the $Er^{3+}$-doped concentration in the core portion 110 is increased, an energy movement in the $Er^{3+}$ ions is caused by electric dipole interactions among them as a result of a decrease in the distance among the $Er^{3+}$ ions in the fluoride glass proportionate to the above increase.

Figure 16:
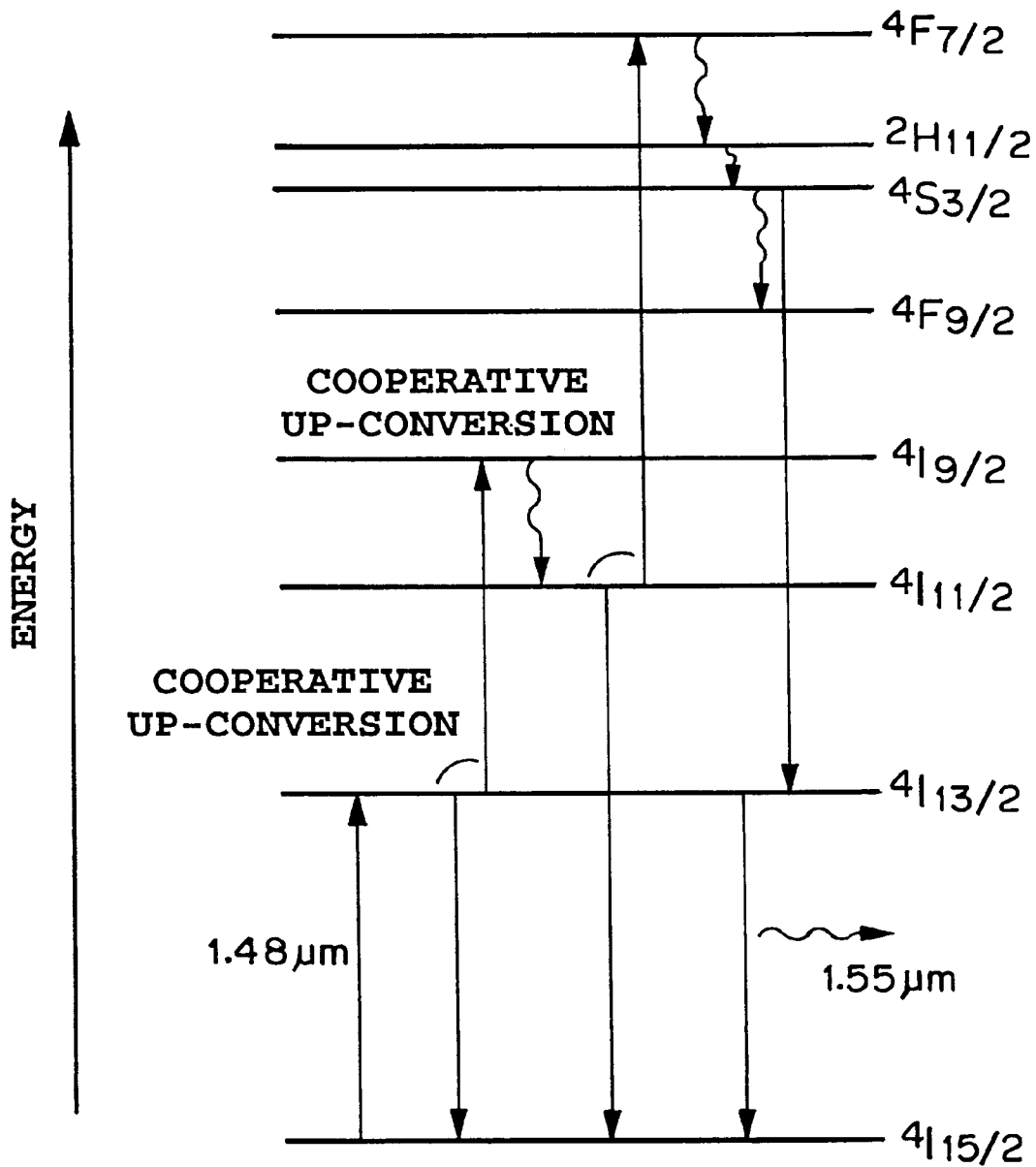
FIG. 16 is an energy diagram of $Er^{3+}$ with consideration given to the mutual interactions among the $Er^{3+}$ ions.

FIG. 16 shows energy levels of $Er^{3+}$ for illustrating excitation states of the $Er^{3+}$ in consideration of interactions among the $Er^{3+}$ ions. If the pump light at a wavelength of 1.48 $\mu$m is launched into the-core portion for the excitation to the $^4I_{13/2}$ level, a cooperative up-conversion is occurred by the transition from the $^4I_{13/2}$ level to the $^4I_{13/2}$ level and the excitation from the $^4I_{13/2}$ level to the $^4I_{9/2}$ level. After the excitation to the $^4I_{9/2}$ level, a relaxation from the $^4I_{9/2}$ level to the $^4I_{11/2}$ level is occurred by a multiple phonon emission, resulting in the excitation to the $^4I_{11/2}$ level. Then, an excited state density of the $^4I_{11/2}$ level is increased and subsequently a cooperative up-conversion is occurred by the transition from the $^4I_{11/2}$ level to the $^4I_{15/2}$ level and the excitation from the $^4I_{11/2}$ level to the $^4F_{7/2}$ level, resulting in the excitation to the $^4F_{7/2}$ level. Finally, the excitation to the energy levels such as $^4S_{3/2}$ and $^4F_{9/2}$, which are not directly excited by the pump light at a wavelength of 1.48 $\mu$m, can be attained. Consequently, an efficiency of the excitation to the $^4I_{13/2}$ level is decreased, so that the possibility of causing an optical amplification at a wavelength of 1.55 $\mu$m is substantially disappeared. In accordance with the present embodiment, the amplifier is constructed so as to increase the excited state density of the $^4I_{13/2}$ level by causing an induced emission from the $^4S_{3/2}$ level to the $^4I_{11/2}$ level. As a consequence, an amplification gain of 30 dB is obtained at a wavelength of 1.55 $\mu$m when the 1.48 $\mu$m pump power is 150 mW and the 0.86 $\mu$m pump power is 20 mW. If the 1.48 $\mu$m pumping power is used, an appropriate amplification gain cannot be obtained. Thus an incident light at a wavelength of 0.86 $\mu$m shows a significant effect on the amplification efficiency.

In this embodiment, furthermore, the light that causes an induced emission from the $^4S_{3/2}$ level to the $^4I_{13/2}$ is launched in the amplifier. As described above, the energy levels of $^4F_{9/2}$, $^4I_{9/2}$, and $^4I_{11/2}$ are also excited, so that an improvement in the amplification efficiency is attained by launching the light that causes an induced emission from any of those energy levels to the $^4I_{13/2}$ level into the amplifier in addition to the incident pumping light at a wavelength of 1.48 μm.

Embodiment 17

An amplifier in the type of an optical waveguide has the same configuration as that of Embodiment 16 as shown in FIG. 15 except as follows. That is, the core and cladding portions are made of a telluride glass. In addition, the core portion is doped with 20% by weight of $Er^{3+}$. Then, operating characteristics of the amplifier having the above structure are studied and the following results are obtained. In the case of using a telluride glass as a material of the optical waveguide, the energy levels of $^4S_{3/2}$, $^4F_{9/2}$, $^4I_{9/2}$, $^4I_{11/2}$, and the like are excited through the interactions among the $Er^{3+}$ ions when the $Er^{3+}$ concentration is high. Therefore, the excitation to the $^4I_{13/2}$ level can be effectively performed as a result of the induced emission from any of those energy levels to the $^4I_{13/2}$ level by launching the light corresponding to the former level into the amplifier. In this embodiment, light at a wavelength of 0.875 μm is launched simultaneously with the 1.48 μm pump light. As a consequence, an amplification gain of 30 dB is obtained at a wavelength of 1.55 μm when the 1.48 μm pump power is 150 mW and the 0.875 μm pump power is 20 mW. If the 1.48 μm pump power is used alone, an appropriate amplification gain cannot be obtained. Thus an incident light at a wavelength of 0.875 μm shows a significant effect on the amplification efficiency.

In this embodiment, the 1.48 μm pump light and the 0.875 μm pump light are launched into the optical waveguide from the same direction. However, they can be launched into the optical waveguide from the opposite directions.

Embodiment 18

An optical amplifier in the type of an optical waveguide has the same construction as that of Embodiments 16 and 17 shown in FIG. 15 except that the core and cladding portions are made of a silica glass and also the core portion is doped with 1% by weight of $Er^{3+}$.

Operating characteristics of the amplifier having the above structure are studied and the following results are obtained. In the case of using a silica glass as a material of the optical waveguide, the energy levels of $^4S_{3/2}$, $^4F_{9/2}$, $^4I_{9/2}$, $^4I_{11/2}$, and the like are excited through the interactions among the $Er^{3+}$ ions when the $Er^{3+}$ concentration is high. Therefore, the excitation to the $^4I_{13/2}$ level can be effectively performed as a result of the induced emission from any of those energy levels to the $^4I_{13/2}$ level by launching the light corresponding to the former level into the amplifier. In this embodiment, light at a wavelength of 0.87 μm is launched simultaneously with the 1.48 μm pump light. As a consequence, an amplification gain of 30 dB is obtained at a wavelength of 1.55 μm when the 1.48 μm pump power is 150 mW and the 0.87 μm pump power is 20 mW. If the 1.48 μm pump power is used alone, an appropriate amplification gain cannot be obtained. Thus an incident light at a wavelength of 0.87 μm shows a significant effect on the amplification efficiency.

As described above, the optical amplifiers and the lasers of Embodiments 5 to 18 are characterized by having first and second light sources at different wavelengths for the pump light. In addition, the first light source is responsible for emitting light at a wavelength corresponding to the energy difference between the $^4I_{13/2}$ level of erbium and an energy level higher than the $^4I_{13/2}$ level. Therefore, as explained above, it is possible to attain the amplification of a 1.55 μm band by the 0.98 μm pump with a low noise amplification whether an infrared-transparent fiber such as a fluoride one (which is regarded as an improper medium by persons skilled in the art) is used as a host of $Er^{3+}$. Hence, an optical amplifier having the characteristics of a flat gain with a wide amplification bandwidth and low noise is obtained. The optical amplifier thus obtained can be applied in a communication system to increase a transmission volume thereof and to provide a diversification of the system configuration to achieve the wide dispersion of an optical communication, the substantial reduction in a manufacturing cost thereof, and so on.

What is claimed is:

1. An optical amplifier that uses $Er^{3+}$ ions as an amplification active elements, comprising:

means for launching at least one light at a wavelength corresponding to an energy difference between $^4I_{15/2}$ level and $^4I_{11/2}$ level of said $Er^{3+}$ ions, at least one light at a wavelength corresponding to an energy difference between $^4I_{15/2}$ level and an energy level higher than said $^4I_{11/2}$ level of said $Er^{3+}$ ions, and at least one light to be amplified by an induced emission transition from $^4I_{13/2}$ level to $^4I_{15/2}$ level into an amplification medium doped with said $Er^{3+}$ ions from the same direction.

2. An optical amplifier as claimed in claim 1, wherein light at a wavelength different from said light to be amplified and corresponding to an energy difference between the $^4I_{13/2}$ level and $^4I_{15/2}$ level of said $Er^{3+}$ ions is launched into said optical amplification medium from a direction different from said same direction.

3. An optical amplification method that uses $Er^{3+}$ ions as amplification active elements, comprising a step of launching light at a wavelength corresponding to an energy difference between $^4I_{15/2}$ level and $^4I_{11/2}$ level of said $Er^{3+}$ ions, light at a wavelength corresponding to an energy difference between $^4S_{3/2}$ level and $^4I_{13/2}$ level of said $Er^{3+}$ ions, and light to be amplified by an induced emission transition from $^4I_{13/2}$ level to $^4I_{15/2}$ level into an amplification medium doped with said $Er^{3+}$ ions from the same direction.

4. An optical amplification method as claimed in claim 3, wherein light at a wavelength different from said light and to be amplified corresponding to an energy difference between the $^4I_{13/2}$ level and $^4I_{15/2}$ level of said $Er^{3+}$ ions is launched into said optical amplification medium from a direction different from said same direction.

5. An optical amplification method that uses $Er^{3+}$ ions as amplification active element, comprising a step of launching light at a wavelength of 0.82 μm to 0.88 μm, light at a wavelength of 0.96 μm to 0.98 μm, and light to be amplified by an induced emission transition from $^4I_{13/2}$ level to $^4I_{15/2}$ level into an amplification medium doped with said $Er^{3+}$ ions from the same direction.

6. An optical amplification method that uses an optical amplifier having: an optical amplification medium doped with $Er^{3+}$ ions and selected from a group of a flouride glass a chalcogenide glass, a telluride glass, a halide crystal, and a lead oxide based glass; a rump light source for exciting said $Er^{3+}$ ions with an oscillation wavelength in a range of 0.96 μm to 0.98 μm; and a light source for an excitation to $^4I_{13/2}$ level, comprising the steps of:

launching pump light, which is emitted in a same direction as that of light to be amplified and launched into said optical amplification medium from said pump light source for exciting said $Er^{3+}$ ions with an oscillation wavelength in a range of 0.96 μm to 0.98 μm, into said optical amplification medium; and launching additional light, which is emitted in an opposite direction of said pump light, from said light source for an excitation to $^4I_{13/2}$ level into said optical amplification medium.

7. An optical amplification method as claimed in claim 6, wherein
said optical amplification medium is in a shape of a fiber.

8. A laser having an optical amplification medium doped with $Er^{3+}$ ions and a pump light source for an excitation of said optical amplification medium and using an induced emission of $Er^{3+}$ ions from $^4I_{13/2}$ level to $^4I_{15/2}$ level, wherein
said pump light source includes at least a first light source and a second light source, which emit light at different wavelengths, and
said first light source is provided as a light source for emitting light at a wavelength corresponding to an energy difference between $^4I_{13/2}$ level of said $Er^{3+}$ ions and an energy level higher than said $^4I_{13/2}$ level.

9. A laser as claimed in claim 8, wherein
said first light source is provided as a light source for emitting light at a wavelength corresponding to an energy difference between $^4I_{13/2}$ level and one energy level selected from a group of $^4I_{11/2}$ level, $^4I_{9/2}$ level, $^4F_{9/2}$ level, and $^4S_{3/2}$ level of said $Er^{3+}$ ions.

10. A laser as claimed in claim 8, wherein
said second light source is provided as a light source for emitting light at a wavelength corresponding to an energy difference between $^4I_{15/2}$ level and one energy level selected from a group of $^4I_{11/2}$ level and $^4F_{9/2}$ level of said $Er^{3+}$ ions.

11. A laser as claimed in claim 8, further comprising a third light source, wherein
said first light source is provided as a light source for emitting light at a wavelength corresponding to an energy difference between $^4I_{13/2}$ level and $^4S_{3/2}$ level of said $Er^{3+}$ ions;
said second light source is provided as a light source for emitting light at a wavelength corresponding to an energy difference between $^4I_{15/2}$ level and $^4I_{11/2}$ level of said $Er^{3+}$ ions; and
said third light source is provided as a light source for emitting light at a wavelength corresponding to an energy difference between $^4I_{15/2}$ level and $^4I_{13/2}$ level of said $Er^{3+}$ ions.

12. A laser as claimed in claim 8, wherein
said first light source is provided as a light source for emitting light at a wavelength of 0.82 µm to 0.88 µm; and
said second light source is provided as a light source for emitting light at a wavelength of 0.96 µm to 0.98 µm.

13. A laser as claimed in claim 8, wherein
said optical amplification medium doped with $Er^{3+}$ ions is selected from a group of a fluoride fiber doped with $Er^{3+}$ ions, a chalcogenide fiber doped with $Er^{3+}$ ions, a telluride fiber doped with $Er^{3+}$ ions, and a halide crystal doped with $Er^{3+}$ ions.

14. An optical amplifier for exciting $Er^{3+}$ ions to a $^4I_{13/2}$ level including:

an optical amplification medium doped with $Er^{3+}$ ions;
means for inducing and isolating signal light at a wavelength of 1.5 µm in said optical amplification medium; and
a pump light source for the excitation of said optical amplification medium, wherein
said pump light source includes at least a first light source and a second light source, which emit light at different wavelengths, and
said first light source is provided as a light source for emitting light at a wavelength corresponding to an energy difference between the $^4I_{13/2}$ level of said $Er^{3+}$ ions and an energy level higher than said $^4I_{13/2}$ level.

15. An optical amplifier as claimed in claim 14, wherein
said first light source is provided as a light source for emitting light at a wavelength corresponding to an energy difference between $^4I_{13/2}$ level and one energy level selected from a group of $^4I_{11/2}$ level, $^4I_{9/2}$ level, $^4F_{9/2}$ level, and $^4S_{3/2}$ level of said $Er^{3+}$ ions.

16. An optical amplifier as claimed in claim 14, wherein
said second light source is provided as a light source for emitting light at a wavelength corresponding to an energy difference between $4I_{15/2}$ level and one energy level selected from a group of $^4I_{11/2}$ level and $^4F_{9/2}$ level of said $Er^{3+}$ ions.

17. An optical amplifier as claimed in claim 14, further comprising a third light source, wherein
said first light source is provided as a light source for emitting light at a wavelength corresponding to an energy difference between $^4I_{13/2}$ level and $^4S_{3/2}$ level of said $Er^{3+}$ ions;
said second light source is provided as a light source for emitting light at a wavelength corresponding to an energy difference between $^4I_{15/2}$ level and $^4I_{11/2}$ level of said $Er^{3+}$ ions; and
said third light source is provided as a light source for emitting light at a wavelength corresponding to an energy difference between $^4I_{15/2}$ level and $^4I_{13/2}$ level of said $Er^{3+}$ ions.

18. An optical amplifier as claimed in claim 14, wherein
said first light source is provided as a light source for emitting light at a wavelength of 0.82 µm to 0.88 µm; and
said second light source is provided as a light source for emitting light at a wavelength of 0.96 µm to 0.98 µm.

19. An optical amplifier as claimed in claim 14, wherein
said second light source is provided as a light source for emitting light at a wavelength corresponding to an energy difference between $^4I_{15/2}$ level and $^4I_{13/2}$ level of said $Er^{3+}$ ions.

20. An optical amplifier as claimed in claim 14, wherein
said optical amplification medium doped with $Er^{3+}$ ions is selected from a group of a fluoride fiber doped with $Er^{3+}$ ions, a chalcogenide fiber doped with $Er^{3+}$ ions, a telluride fiber doped with $Er^{3+}$ ions, and a halide crystal doped with $Er^{3+}$ ions.

* * * * *